(12) United States Patent
Krichevsky et al.

(10) Patent No.: US 12,442,990 B2
(45) Date of Patent: Oct. 14, 2025

(54) TECHNOLOGIES FOR COUPLING FROM PHOTONIC INTEGRATED CIRCUITS WITH AN OPTICAL ISOLATOR

(71) Applicant: Intel Corporation, Santa Clara, CA (US)

(72) Inventors: Alexander Krichevsky, Cupertino, CA (US); Boping Xie, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 17/561,286

(22) Filed: Dec. 23, 2021

(65) Prior Publication Data

US 2023/0204876 A1 Jun. 29, 2023

(51) Int. Cl.
*G02B 6/42* (2006.01)

(52) U.S. Cl.
CPC ......... *G02B 6/4207* (2013.01); *G02B 6/4214* (2013.01)

(58) Field of Classification Search
CPC ............................ G02B 6/4207; G02B 6/4214
See application file for complete search history.

(56) References Cited

U.S. PATENT DOCUMENTS

| | | | |
|---|---|---|---|
| 5,633,527 A | 5/1997 | Lear | |
| 6,733,189 B2 | 5/2004 | Hurt et al. | |
| 7,045,089 B2 | 5/2006 | Afromowitz | |
| 9,793,424 B2 | 10/2017 | Cho et al. | |
| 10,481,334 B2 | 11/2019 | Israel et al. | |
| 10,488,605 B1 | 11/2019 | Budd et al. | |
| 10,866,367 B2 | 12/2020 | Borrelli et al. | |
| 11,531,171 B2 | 12/2022 | Menezo | |
| 11,894,474 B2 | 2/2024 | Dobriyal et al. | |
| 2002/0118907 A1* | 8/2002 | Sugama | G02B 6/43 385/129 |
| 2004/0223761 A1 | 11/2004 | Kropp | |
| 2006/0239605 A1 | 10/2006 | Palen et al. | |
| 2007/0293044 A1 | 12/2007 | Perozziello et al. | |
| 2012/0141143 A1 | 6/2012 | Hayashi et al. | |
| 2015/0318952 A1* | 11/2015 | Butrie | H04B 10/503 398/139 |

(Continued)

FOREIGN PATENT DOCUMENTS

| | | |
|---|---|---|
| CN | 110637246 A | 12/2019 |
| JP | 2004302459 A | 10/2004 |

OTHER PUBLICATIONS

USPTO; Notice of Allowance issued in U.S. Appl. No. 17/120,039, dated Oct. 11, 2024; 9 pages.

(Continued)

*Primary Examiner* — Sung H Pak
(74) *Attorney, Agent, or Firm* — Alliance IP, LLC

(57) ABSTRACT

Technologies for coupling to and from a photonic integrated circuit (PIC) with an optical isolator are disclosed. In one embodiment, light beams from waveguides on a PIC die are reflected towards flat mirrors on the bottom surface of the PIC die. The flat mirrors reflect the light towards curved mirrors defined in a top surface of the PIC die, which collimate the beam and direct the collimated beams out the bottom surface of the PIC die. An optical isolator below the PIC die can allow the beams to pass while blocking beams in the opposite direction.

25 Claims, 17 Drawing Sheets

(56) References Cited

U.S. PATENT DOCUMENTS

| | | |
|---|---|---|
| 2016/0049528 A1 | 2/2016 | Cho et al. |
| 2016/0266322 A1 | 9/2016 | Epitaux et al. |
| 2017/0261703 A1 | 9/2017 | Bowen et al. |
| 2018/0031791 A1 | 2/2018 | Israel et al. |
| 2018/0045891 A1 | 2/2018 | Israel et al. |
| 2018/0335566 A1 | 11/2018 | Menezo et al. |
| 2019/0123109 A1 | 4/2019 | Xie et al. |
| 2019/0324211 A1 | 10/2019 | Israel et al. |
| 2020/0168749 A1 | 5/2020 | Nishimura et al. |
| 2020/0278508 A1 | 9/2020 | Israel et al. |
| 2021/0003777 A1 | 1/2021 | Israel et al. |
| 2021/0058159 A1 | 2/2021 | Krichevsky et al. |
| 2021/0132306 A1 | 5/2021 | Krichevsky et al. |
| 2021/0165165 A1 | 6/2021 | Israel et al. |

OTHER PUBLICATIONS

USPTO; Non-Final Office Action issued in U.S. Appl. No. 17/120,039, dated Jan. 30, 2024; 15 pages.

EPO; Office Action issued in EP Patent Application No. 21197110.6, dated Jan. 8, 2025; 6 pages.

EPO; Extended European Search Report issued in EP Patent Application No. 21197110.6, dated Mar. 28, 2022; 8 pages.

USPTO; Non-Final Office Action issued in U.S. Appl. No. 17/120,039, dated May 16, 2024; 10 pages.

Butkute, Agne et al., "Optimization of Selective Laser Etching (SLE) for Glass Micromechanical Structure Fabrication," Optics Express 23487, vol. 29, No. 15/19, Jul. 2021 (13 pages).

Marchetti, Riccardo et al., "Coupling Strategies for Silicon Photonics Integrated Chips [Invited]," Photonics Research 201, Vo. 7, No. 2/ Feb. 2019 (39 pages).

U.S. Appl. No. 17/869,372, filed Jul. 20, 2022, inventors Nicholas D. Psaila et al.

U.S. Appl. No. 17/871,647, filed Jul. 22, 2022, inventor Nicholas D. Psaila.

USPTO; U.S. Appl. No. 17/561,694, filed Dec. 23, 2021; 36 pages.

USPTO; Non-Final Office Action issued in U.S. Appl. No. 17/561,694, dated Mar. 6, 2025; 13 pages.

USPTO; Non-Final Office Action issued in U.S. Appl. No. 17/871,647, dated Aug. 27, 2025; 9 pages.

* cited by examiner

TECHNOLOGIES FOR COUPLING FROM PHOTONIC INTEGRATED CIRCUITS WITH AN OPTICAL ISOLATOR

BACKGROUND

Photonic integrated circuits (PICs) can be used for several applications such as communications. Efficiently and cheaply aligning optics to couple light into and out of PICs can be a challenge. Approaches include using V-grooves to align a fiber connector or fabricating a lens attached to the PIC. However, these approaches can be expensive and/or result in low yield.

DETAILED DESCRIPTION

Figure 1:
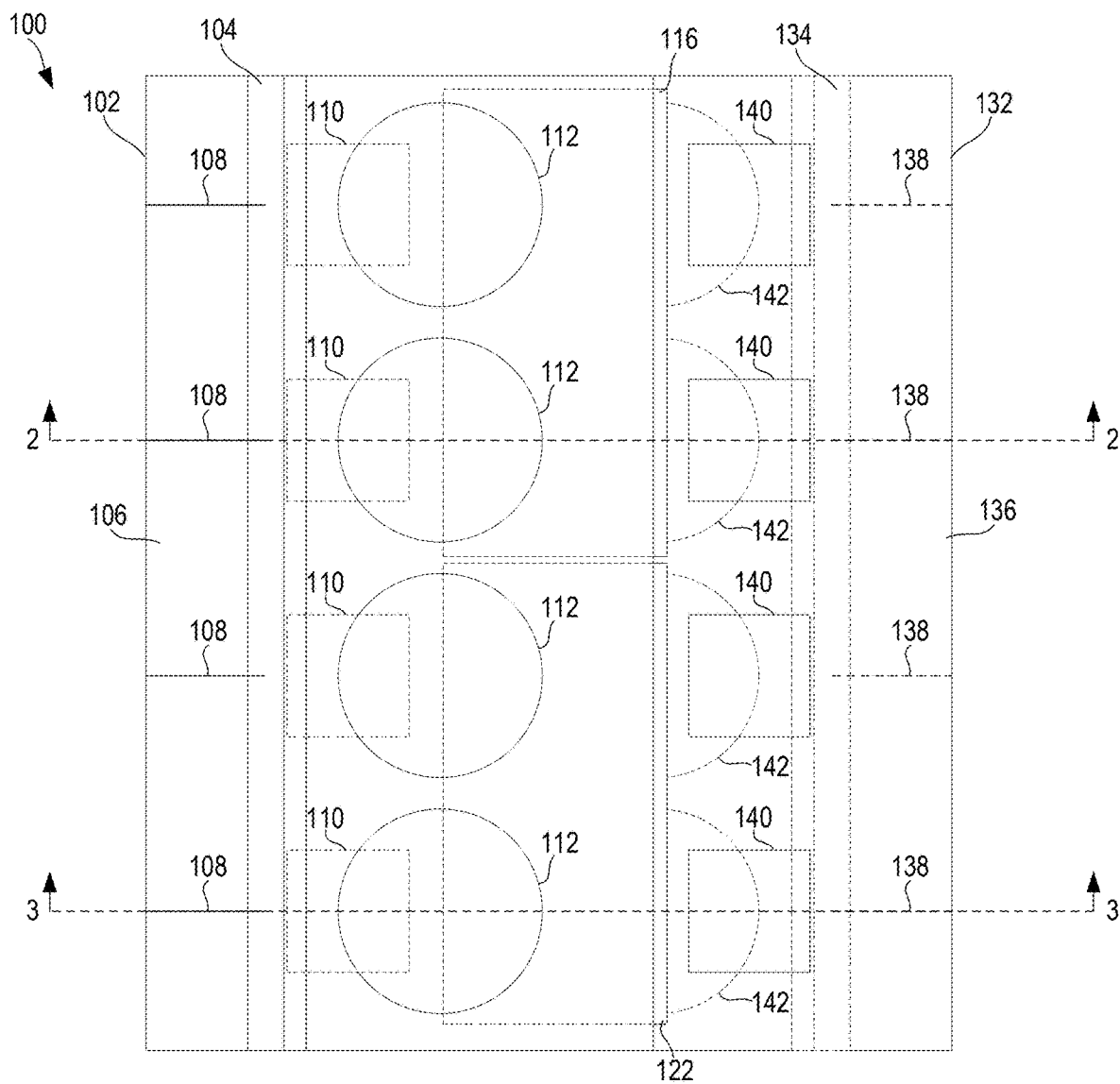
FIG. 1 is a top-down view of a system including a photonic integrated circuit die.

In various embodiments disclosed herein, one or more focusing mirrors are fabricated on a surface of a photonic integrated circuit (PIC) die relative to one or more waveguides in the PIC die to facilitate coupling into and out of waveguides of the PIC die. In the illustrative embodiment, light from the waveguides is reflected towards a flat mirror on the bottom surface of the PIC die, which reflects the light towards the curved mirrors. The light is collimated at the curved mirrors and directed out the bottom of the PIC die. In the illustrative embodiment, an optical isolator is positioned below the bottom of the PIC die to prevent any reflected light from reentering the waveguides. In embodiments in which light is being coupled from off the PIC die into one of the waveguides, an optical isolator may not be used or may not be in the path of the incoming light.

As used herein, the phrase "communicatively coupled" refers to the ability of a component to send a signal to or receive a signal from another component. The signal can be any type of signal, such as an input signal, an output signal, or a power signal. A component can send or receive a signal to another component to which it is communicatively coupled via a wired or wireless communication medium (e.g., conductive traces, conductive contacts, air). Examples of components that are communicatively coupled include integrated circuit dies located in the same package that communicate via an embedded bridge in a package substrate and an integrated circuit component attached to a printed circuit board that send signals to or receives signals from other integrated circuit components or electronic devices attached to the printed circuit board.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact, and "coupled" may indicate elements co-operate or interact, but they may or may not be in direct physical or electrical contact. Furthermore, the terms "comprising," "including," "having," and the like, as used with respect to embodiments of the present disclosure, are synonymous. Terms modified by the word "substantially" include arrangements, orientations, spacings, or positions that vary slightly from the meaning of the unmodified term. For example, the central axis of a magnetic plug that is substantially coaxially aligned with a through hole may be misaligned from a central axis of the through hole by several degrees. In another example, a substrate assembly feature, such as a through width, that is described as having substantially a listed dimension can vary within a few percent of the listed dimension.

It will be understood that in the examples shown and described further below, the figures may not be drawn to scale and may not include all possible layers and/or circuit components. In addition, it will be understood that although certain figures illustrate transistor designs with source/drain regions, electrodes, etc. having orthogonal (e.g., perpendicular) boundaries, embodiments herein may implement such boundaries in a substantially orthogonal manner (e.g., within +/−5 or 10 degrees of orthogonality) due to fabrication methods used to create such devices or for other reasons.

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

As used herein, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

As used herein, the term "adjacent" refers to layers or components that are in physical contact with each other. That is, there is no layer or component between the stated adjacent layers or components. For example, a layer X that is adjacent to a layer Y refers to a layer that is in physical contact with layer Y.

Figure 2:
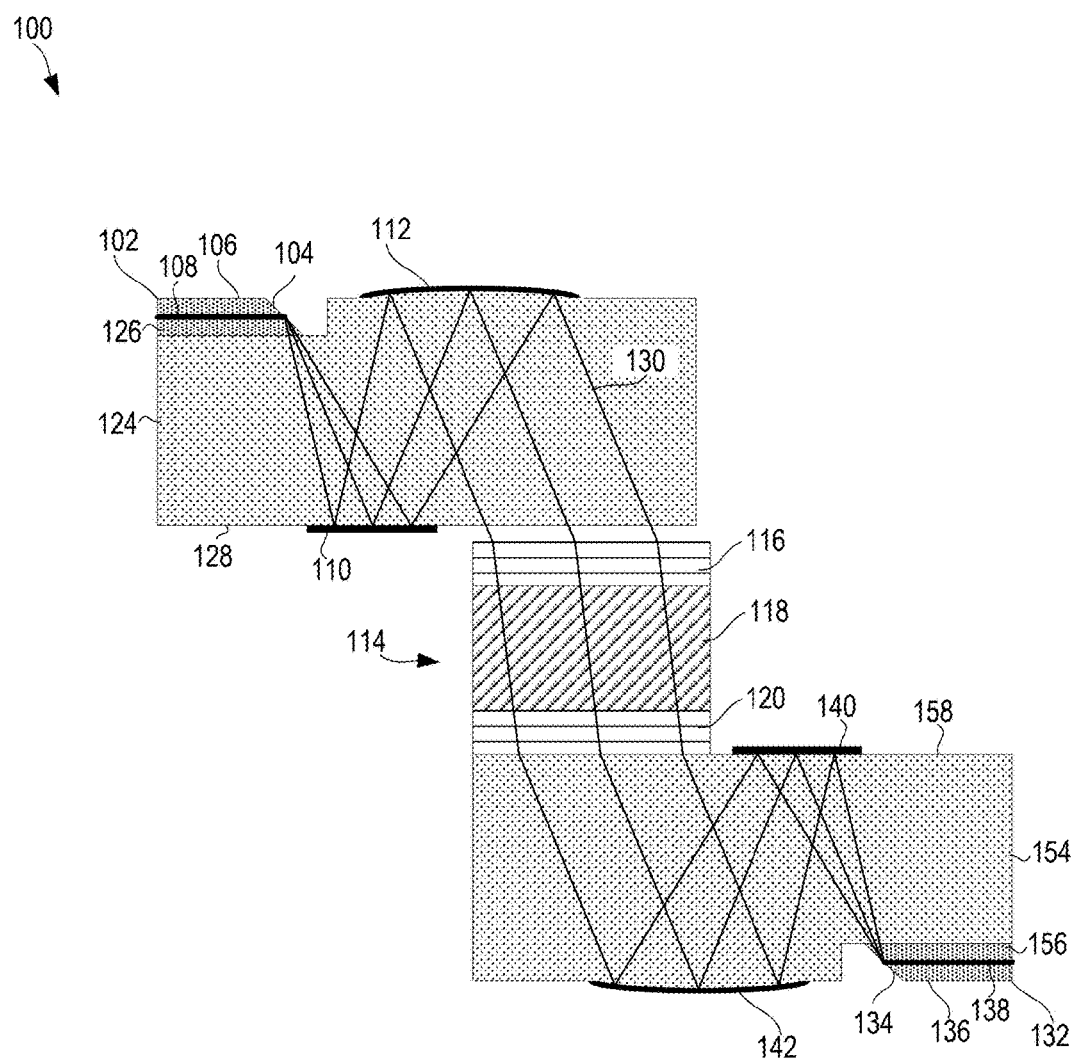
FIG. 2 is a cross-sectional view of the system of FIG. 1.
Figure 3:
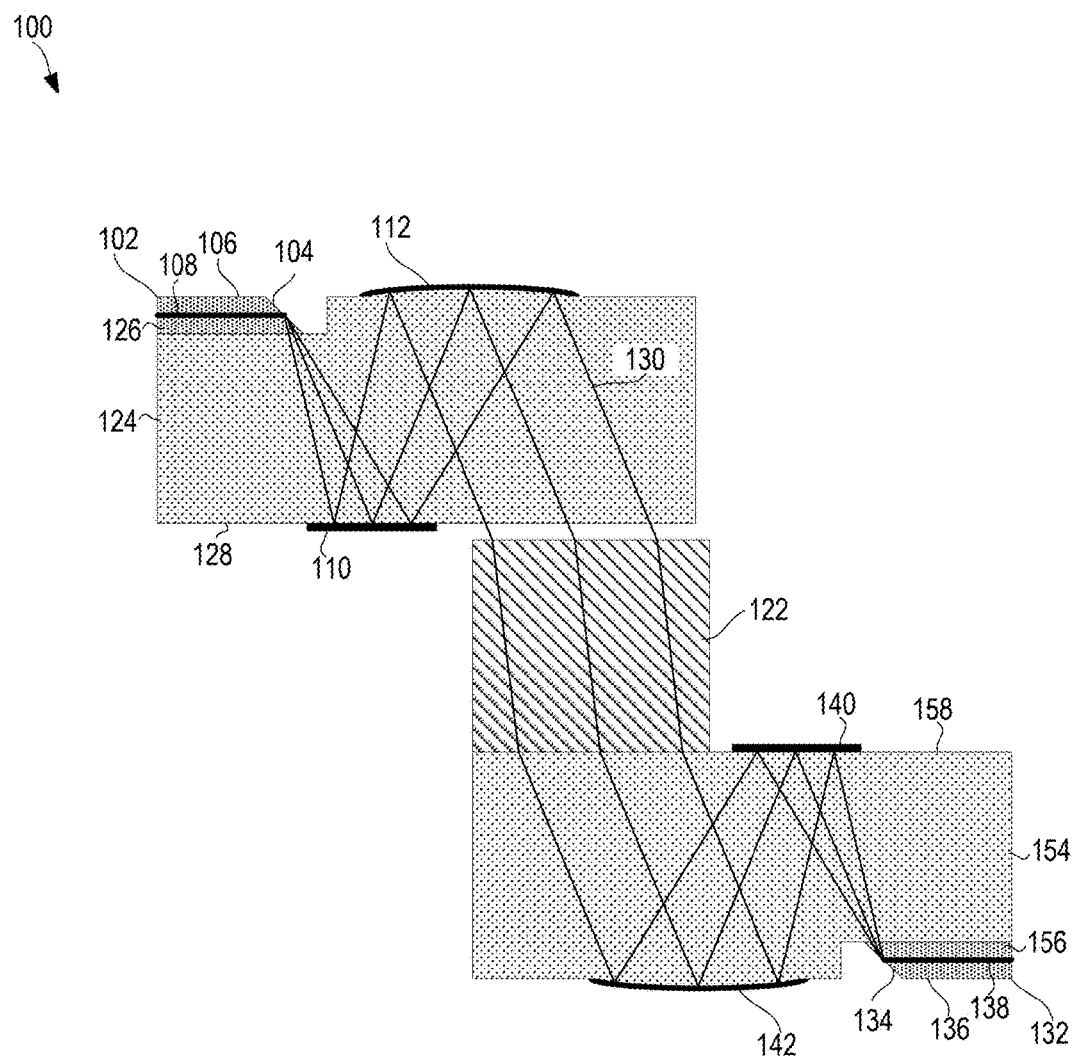
FIG. 3 is a cross-sectional view of the system of FIG. 1.

Referring now to FIGS. 1-3, in one embodiment, a system 100 includes a first photonic integrated circuit (PIC) die 102 and a second PIC die 132. FIG. 1 shows a top-down view of the system 100, FIG. 2 shows a first cross-sectional view of the system 100 taken along the view marked 2 in FIG. 1 and FIG. 3 shows a second cross-sectional view of the system 100 taken along the view marked 3 in FIG. 1. The illustrative PIC die 102 is configured to generate, detect, and/or manipulate light. One or more waveguides 108 are defined in the PIC die 102 to guide light. A reflector 104 redirects beams 130 of light from the waveguides 108 towards one or more flat mirrors 110 on the bottom surface 128 of the PIC die 102. The flat mirrors 110 reflect the beams 130 towards one or more curved mirrors 112 defined in the top surface 106 of the PIC die 102. The curved mirrors 112 collimate the beams 130 and direct them out of the PIC die 102 through the bottom surface 128.

It should be appreciated that, as used herein, the "top surface" 106 refers to an outer surface of the PIC die 102 (or other PIC dies disclosed herein) and may, in some embodiments, be, e.g., a bottom surface or side surface of the PIC die 102, depending on the orientation of the PIC die 102. The illustrative PIC die 102 is much thinner in one dimension than the other two, and the top surface 106 refers to a surface extending along the two larger dimensions of the PIC die 102. The bottom surface 128 is opposite the top surface 106.

For some of the beams 130, as shown in FIG. 2, an optical isolator 114 is positioned below the PIC die 102. The beams 130 pass through a first polarizer 116, a Faraday rotator 118, and a second polarizer. In the illustrative embodiment, the first polarizer 116 polarizes light at a 45° angle relative to the second polarizer 120, and, when the beam 130 passes from the first PIC die 102 towards the second PIC die 132, the Faraday rotator 118 rotates the light 45°. As such, beams 130 can pass through the optical isolator 114 from the first PIC die 102 to the second PIC die 132, but not from the second PIC die 132 to the first PIC die 102.

The optical isolator 114 is attached to the second PIC die 132. The second PIC die 132 includes similar components to the first PIC die 102, with a symmetrical optical path. The beams 130 pass through the top surface 158 of the PIC die 132, towards one or more curved mirrors 142 defined in the bottom surface 136 of the PIC die 132. The beams 130 are reflected towards one or more flat mirrors 140 on the top surface 158, and then reflected towards a reflector surface 134, which couples the beams 130 into one or more waveguides 138 defined in the PIC die 132 near the bottom surface 136.

The PIC die 102, 132 may include one or more lasers or other light sources, detectors, amplitude and/or phase modulators, filters, splitters, amplifiers, etc. In one embodiment, the PIC die 102, 132 may receive electrical signals, such as from another component that the PIC die 102, 132 is mounted on, and generate a corresponding optical signal in a waveguide 108, 138 to be sent to a remote device. Additionally or alternatively, the PIC die 102, 132 may receive optical signals in a waveguide 108, 138 and generate a corresponding electrical signal, which may be sent to another component on the PIC die 102, 132. The PIC die 102, 132 may operate at any suitable optical wavelength, such as 1,200-1,800 nanometers. In some embodiments, the PIC die 102, 132 may operate at a higher or lower wavelength, such as ultraviolet, visible, near infrared, far infrared, etc. In the illustrative embodiment, the PIC die 102, 132 operates in the near infrared at a wavelength that is transparent in silicon.

In the illustrative embodiment, the PIC die 102 has an oxide layer 126 on a substrate layer 124. In the illustrative embodiment, the waveguides 108 are defined in the oxide layer 126, with the oxide layer 126 acting as a cladding to the waveguide 108. The illustrative substrate layer 124 is silicon. The illustrative waveguides 108 are silicon core waveguides in a silicon oxide layer 126. The higher index of refraction of the silicon relative to the silicon dioxide confines the light to the waveguides 108. In other embodiments, the core of the waveguide 108 may be, e.g., silicon nitride, silicon dioxide, indium phosphide, gallium arsenide, or any other suitable core material in any suitable cladding. In some embodiments, the waveguides 108 may change size in one or both dimensions to allow the light to expand at or before the reflector surface 104. In the illustrative embodiment, the reflector 104 is a surface angled to cause total internal reflection of some or all of the light in the waveguides 108. Additionally or alternatively, in some embodiments, the surface of the reflector 104 may have a metal or other reflective coating to reflect the light. In some embodiments, reflectors 104 may take a different form from a reflective surface, such as a vertically integrated taper, a grating, etc.

Each waveguide 108 may have any suitable dimensions, such as a width and/or height of 0.1-10 micrometers. In the illustrative embodiment, each waveguide 108 has a square cross-section. In other embodiments, the waveguide 108 may have a different shape, such as a rectangular cross-section. The PIC die 102 may include any suitable number of waveguides, such as 1-32 waveguides 108. Of course, the PIC die 102 may include additional waveguides internally.

The waveguides 108 may be separated by any suitable distance, such as 50-1,000 micrometers. The waveguides 108 are spaced apart enough that the beams 130 projected from the reflectors 104 do not overlap once collimated by the mirrors 112. Each waveguide 108 may support one or more channels, such as 1-50 channels. Each channel may have any suitable bandwidth, such as 0.1-1,000 gigabits per second.

In the illustrative embodiment, the mirrors 112 are spherical. In other embodiments, the mirrors 112 may have aspherical surfaces that may correct for aberrations such as spherical aberration or may have another shape such as a paraboloid, an ellipsoid, etc. The mirrors 112 may have any suitable spacing between them, such as 50-1,000 micrometers, measured from the center of one mirror 112 to the next mirror 112. The mirrors 112 may have any suitable focal length, such as 0.4-10 millimeters. The PIC die 102 may have a thickness proportional to the focal length, such that the optical path from the reflector 104 to the mirror 112 is about the focal length (taking into account the index of refraction of the various materials in the optical path). The mirrors 112 may collimate light from the waveguides 108 to a beam with any suitable width, such as 20-1,000 micrometers. As used herein, a beam width or beam waist refers to the $1/e^2$ width, unless stated otherwise. In the illustrative embodiment, the mirrors 112 collimate the light to a beam with a width of 50-200 micrometers.

In the illustrative embodiment, the mirror 110 is a metal coating applied to the bottom surface 128 of the PIC die 102. The metal coating may be, e.g., silver, aluminum, gold, or other metal. In other embodiments, the mirror 110 may be formed in a different manner, such as a thin film interference mirror. In some embodiments, a mirror 110 may extend over more than one waveguide 108, rather than having a separate mirror 110 for each waveguide 108. It should be appreciated that, as the mirrors 110 are flat, they do not need to be positioned precisely on the bottom surface 128 of the PIC die 102, as long as they extend to where the beams 130 hit.

In the illustrative embodiment, the curved mirror 112 extends past the top surface 106 of the PIC die 102. The curved mirror 112 may extend past the top surface 106 of the PIC die 102 by, e.g., 0.1-10 micrometers, depending on the width and focal length of the curved mirror 112. The width of the curved mirror 112 may be any suitable value, such as the 0.5-5 times the beam waist of the beam 130.

In some embodiments, some or all of the optical surfaces (such as the bottom surface 128, the polarizer 116, etc.) may have anti-reflection or other impedance-matching coatings in order to reduce reflections. Similar coatings may be applied to any suitable optical surface in any embodiment disclosed herein.

The optical isolator 114 may have any suitable dimensions that do not significantly clip the beams 130. In the illustrative embodiment, the Faraday rotator 118 has a thickness of about 300 micrometers, and each polarizer 116, 120 has a thickness of about 200 micrometers. In the illustrative embodiment, the optical isolator 114 is fixed to the PIC die 132, such as by epoxy. Additionally or alternatively, in other embodiments, the optical isolator 114 may be fixed to the PIC die 102 or may not be fixed to either of the PIC dies 102, 132. It should be appreciated that, as the beam 130 is incident on the optical isolator 114 at an angle, reflections from the optical isolator 114 will not couple back into the waveguides 108.

The various components of the PIC die 132 may be similar to those of the PIC die 102. For example, the oxide layer 156 may be similar to the oxide layer 126, the substrate layer 154 may be similar to the substrate layer 124, the waveguides 138 may be similar to the waveguides 108, etc. A description of the components of the PIC die 132 will not be repeated in the interest of clarity.

The beams 130 shown in FIG. 2 that pass through the isolator 114 are transmitted from the waveguide 108, and the isolator prevents any back reflections that could, e.g., destabilize a laser. However, in some embodiments, some of the waveguides 108 may be used to receive light from another source, such as the PIC die 132. In such embodiments, the isolators 114 cannot be in the path of the beams 130 to the receiving waveguides 108, as it would block that light. As such, in one embodiment, an optical isolator 114 is not placed in the path of beams 130 from the PIC die 132 to the PIC die 102. Rather, as shown in FIG. 3, the optical isolator 114 is replaced with a compensator block 122. The compensator block 122 causes a similar displacement of the beam as the optical isolator 114, keeping the beam 130 aligned with the receiving waveguides 108. In the illustrative embodiment, the compensator block 122 has similar dimensions and a similar average index of refraction as the optical isolator 114. The compensator block 122 may be made of any suitable material, such as any suitable type of glass, metal oxide, flint glass, etc.

Figure 4:
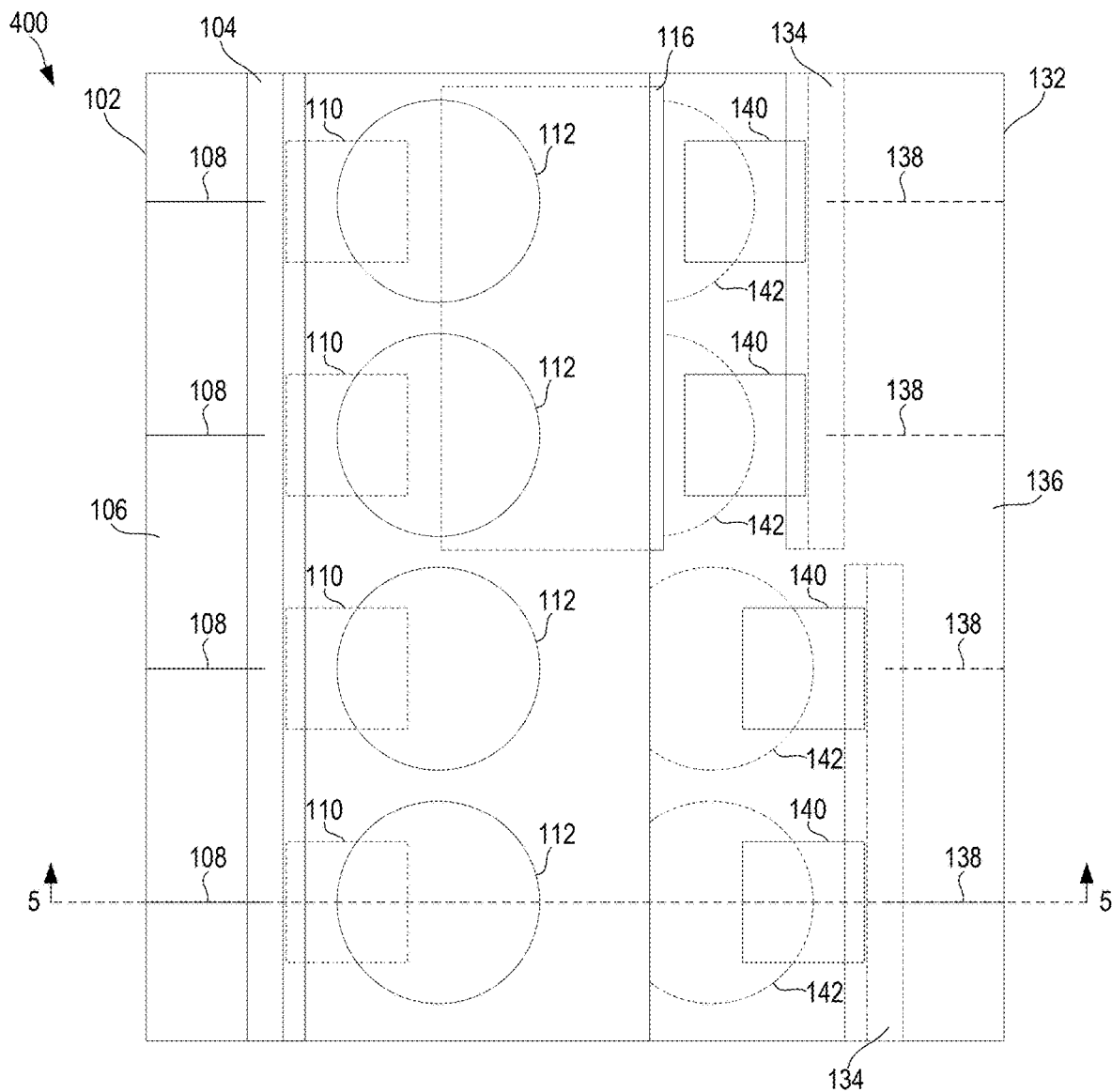
FIG. 4 is a top-down view of a system including a photonic integrated circuit die.
Figure 5:
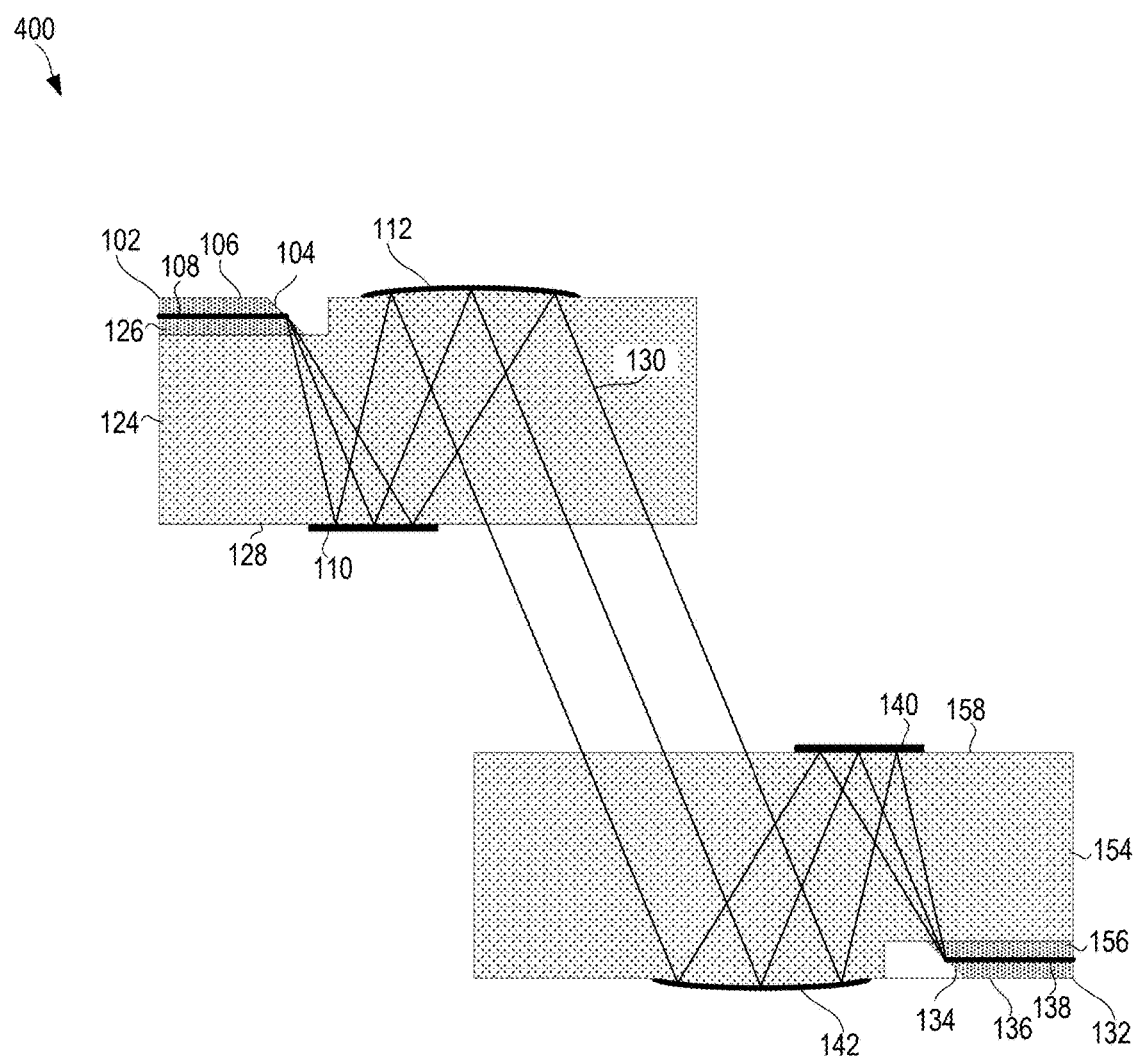
FIG. 5 is a cross-sectional view of the system of FIG. 4.

Referring now to FIGS. 4 and 5, in one embodiment, a system 400 includes a photonic integrated circuit (PIC) die 102. FIG. 4 shows a top-down view of the system 400, and FIG. 5 shows a cross-sectional view of the system 400. Some of the components of the system 400 (and other systems, such as the systems 600, 800, etc.), such as the PIC die 102, the waveguides 108, the reflectors 104, the mirrors 110, the second PIC die 132, etc., may be similar to or the same as a corresponding component in the system 100, a description of which will not be repeated in the interest of clarity.

The illustrative system 400 includes the optical isolator 114 for beams 130 transmitted from the PIC die 102 to the PIC die 132, but does not include the compensator block. As shown in FIG. 5, the lack of the compensator block results in more translation of the beam as it traverses from the PIC die 102 to the PIC die 132. As a result, the curved mirror 142, flat mirror 140, waveguide 138, etc., are set back a corresponding amount, as shown in FIGS. 4 and 5. As shown in FIG. 4, the reflector 134 of the PIC die 132 is separated into two parts, one for the beams 130 received from the PIC die 102, and one for the beams 130 transmitted to the PIC die 102.

Figure 6:
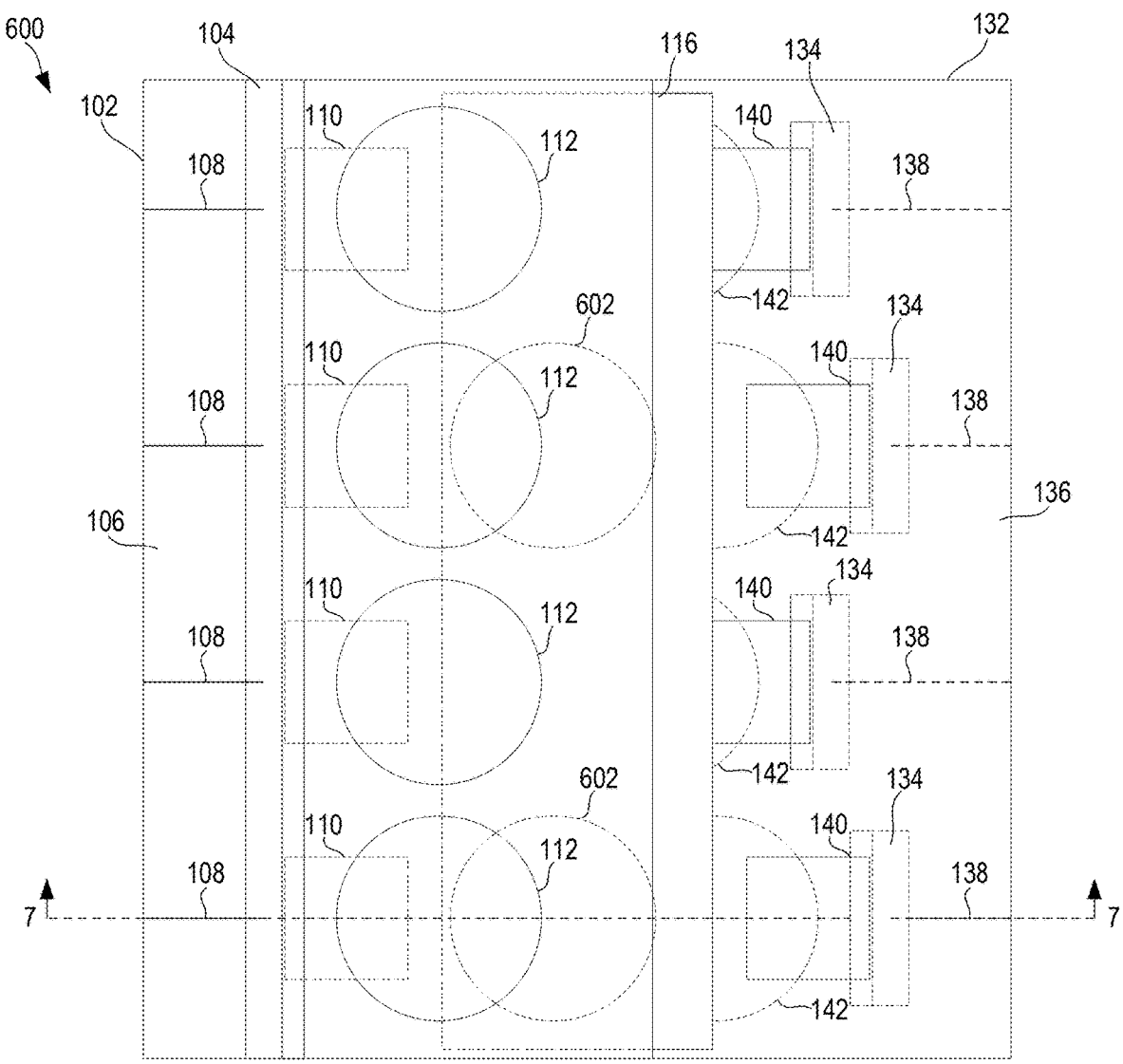
FIG. 6 is a top-down view of a system including a photonic integrated circuit die.
Figure 7:
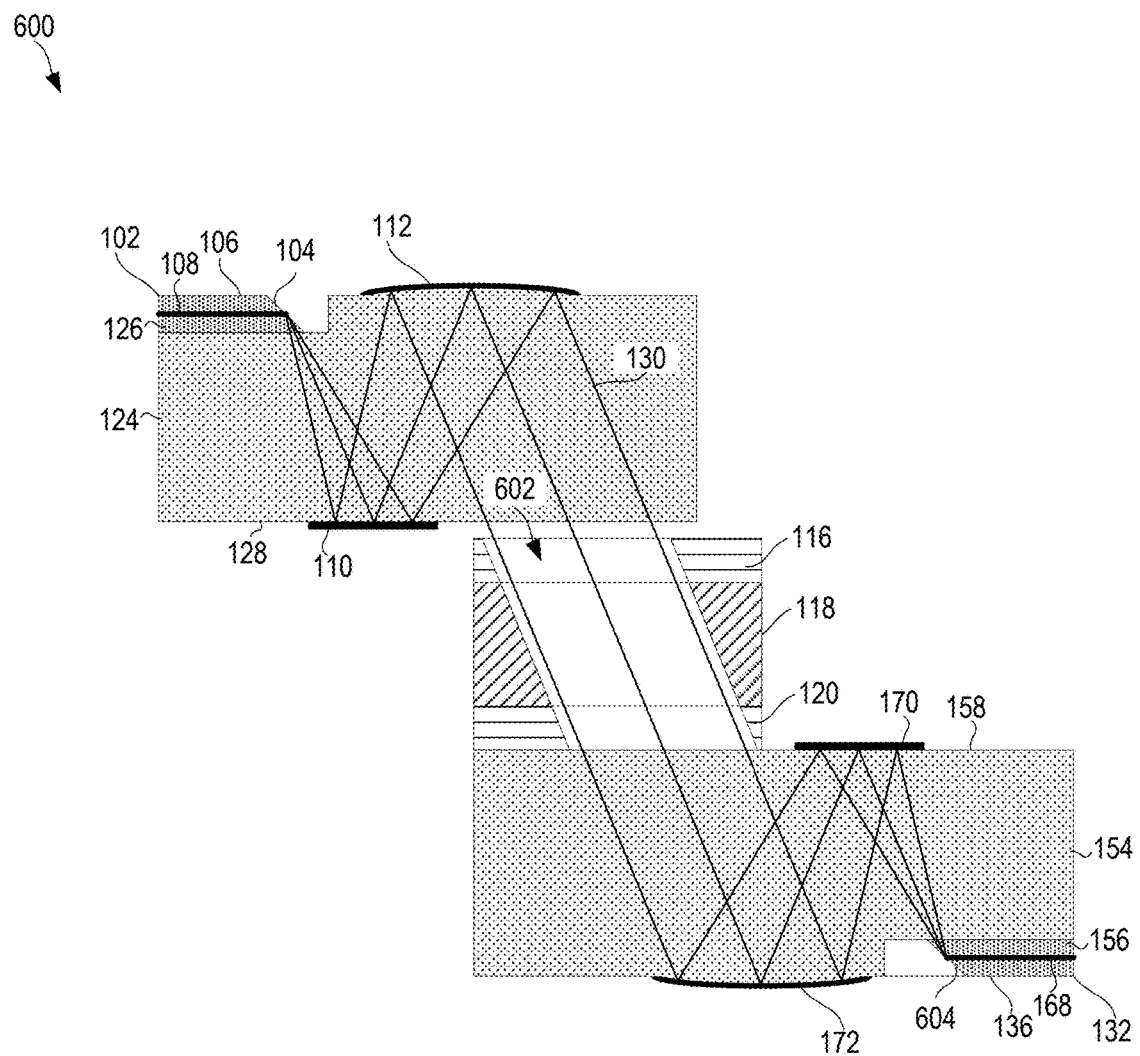
FIG. 7 is a cross-sectional view of the system of FIG. 6.

Referring now to FIGS. 6 and 7, in one embodiment, a system 600 includes a photonic integrated circuit (PIC) die 102. FIG. 6 shows a top-down view of the system 600, and FIG. 7 shows a cross-sectional view of the system 600. In some embodiments, the PIC die 102 may benefit from having a transmit waveguide 108 paired with a receive waveguide 108. In the system 600, transmit waveguides 108 are interleaved with receive waveguides 108, forming pairs of transmit/receive waveguides 108. As light from the transmit waveguide 108 should pass through the isolator 114, and light to the receive waveguide 108 cannot pass through the isolator 114, the isolator 114 cannot simply extend across a row of several beams 130, some of which are transmit beams 130 and some of which are receive beams 130. In order to address the requirement that the beams 130 sent by the PIC die 132 to the PIC die 102 are not blocked by the isolator 114, the isolator 114 of the system 600 has one or more holes 602 in it to allow beams 130 to pass from the PIC die 132 to the PIC die 102. The holes 602 may be angled in a similar direction as the beam 130, as shown in FIG. 7, or may be vertical. The holes 602 may be formed in any suitable manner, such as using a mechanical drill.

Figure 8:
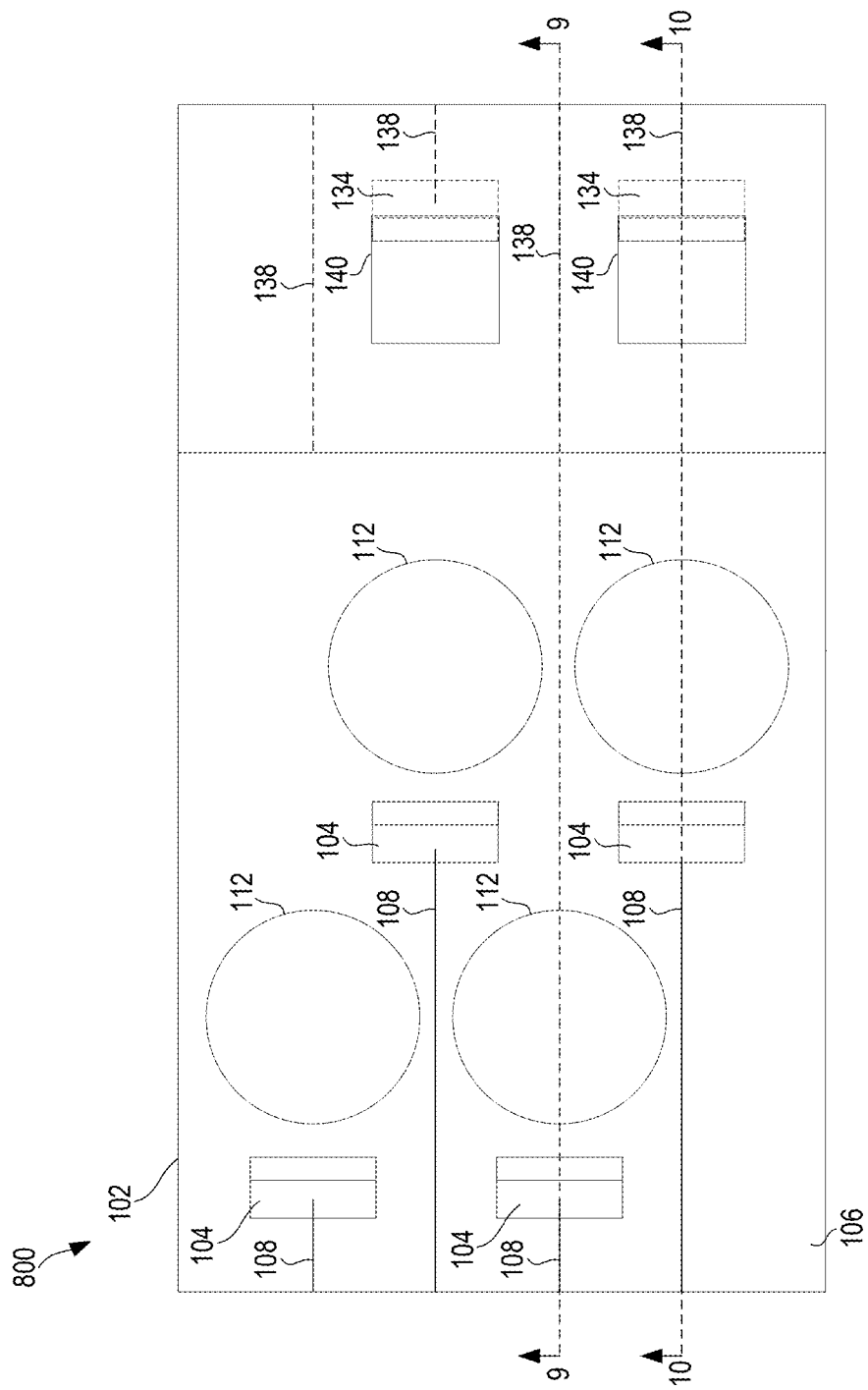
FIG. 8 is a top-down view of a system including a photonic integrated circuit die.
Figure 9:
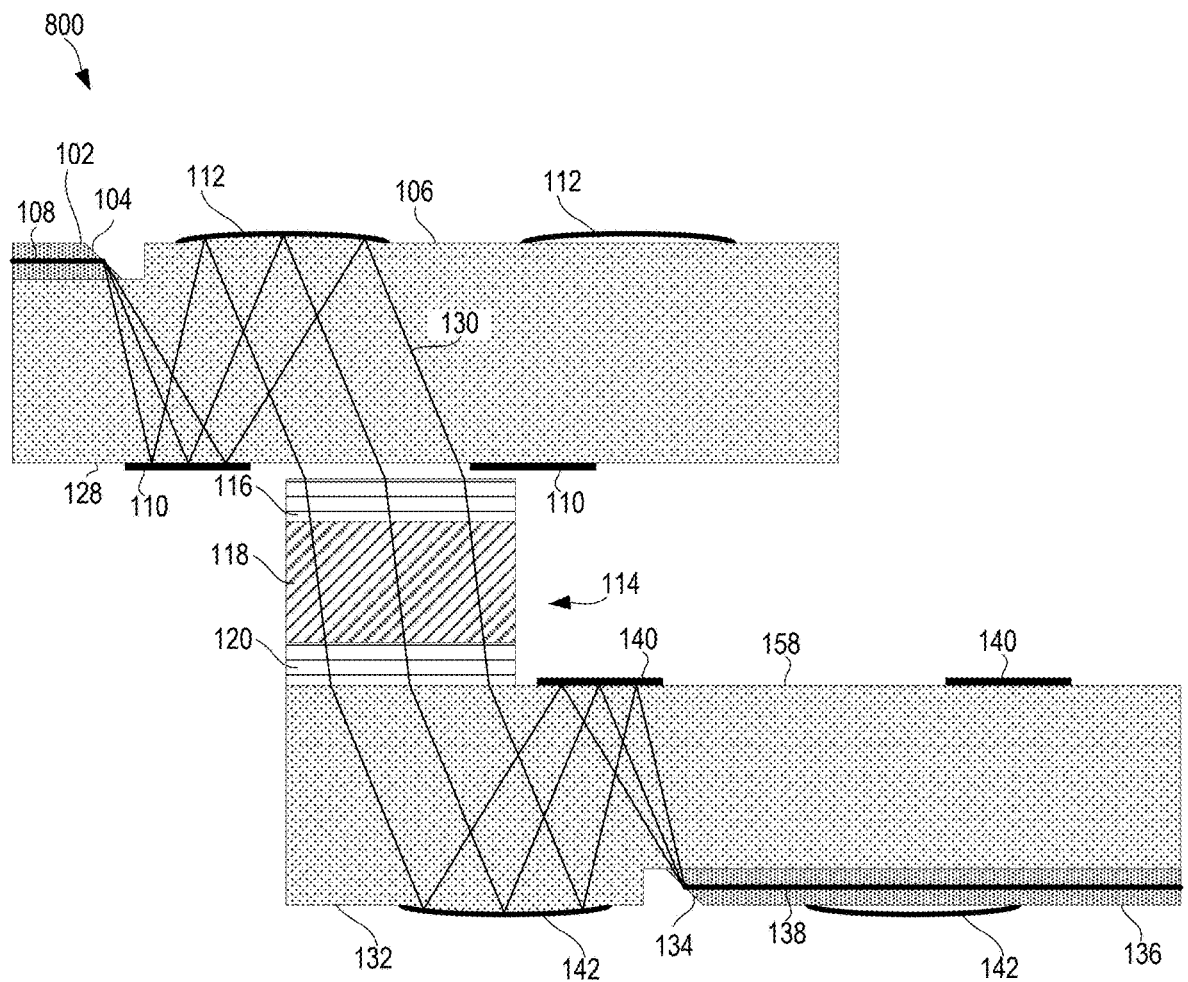
FIG. 9 is a cross-sectional view of the system of FIG. 8
Figure 10:
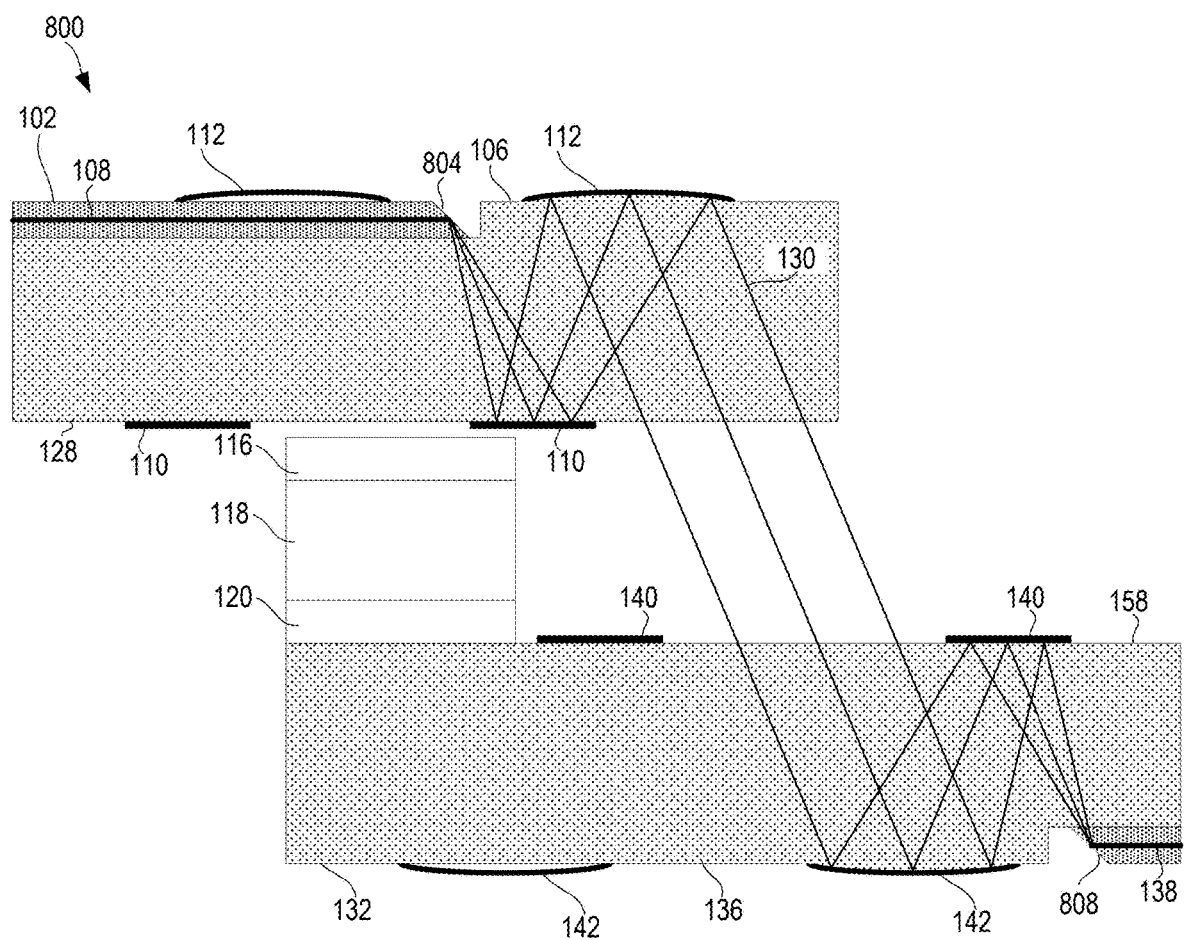
FIG. 10 is a cross-sectional view of the system of FIG. 8.

Referring now to FIGS. 8-10, in one embodiment, a system 800 includes a photonic integrated circuit (PIC) die 102. FIG. 8 shows a top-down view of the system 800, and FIG. 9 shows a first cross-sectional view of the system 800, and FIG. 10 shows a second cross-sectional view of the system 800. As for the system 600, the system 800 may have a transmit waveguide 108 paired with a receive waveguide 108. In the system 800, the receive waveguide 108 may be offset from a neighboring transmit waveguide 108, allowing the beams 130 from all of the transmit waveguides 108 to pass through an optical isolator 114, as shown in FIG. 9. The waveguides 108 for the receive beams 130 extend far enough past the waveguides 108 for the transmit beams 130 that the receive beams 130 do not pass through or clip on the isolator 114, allowing the receive beams 130 to pass from the PIC die 132 to the PIC die 102 without being blocked by the isolator 114.

Figure 11:
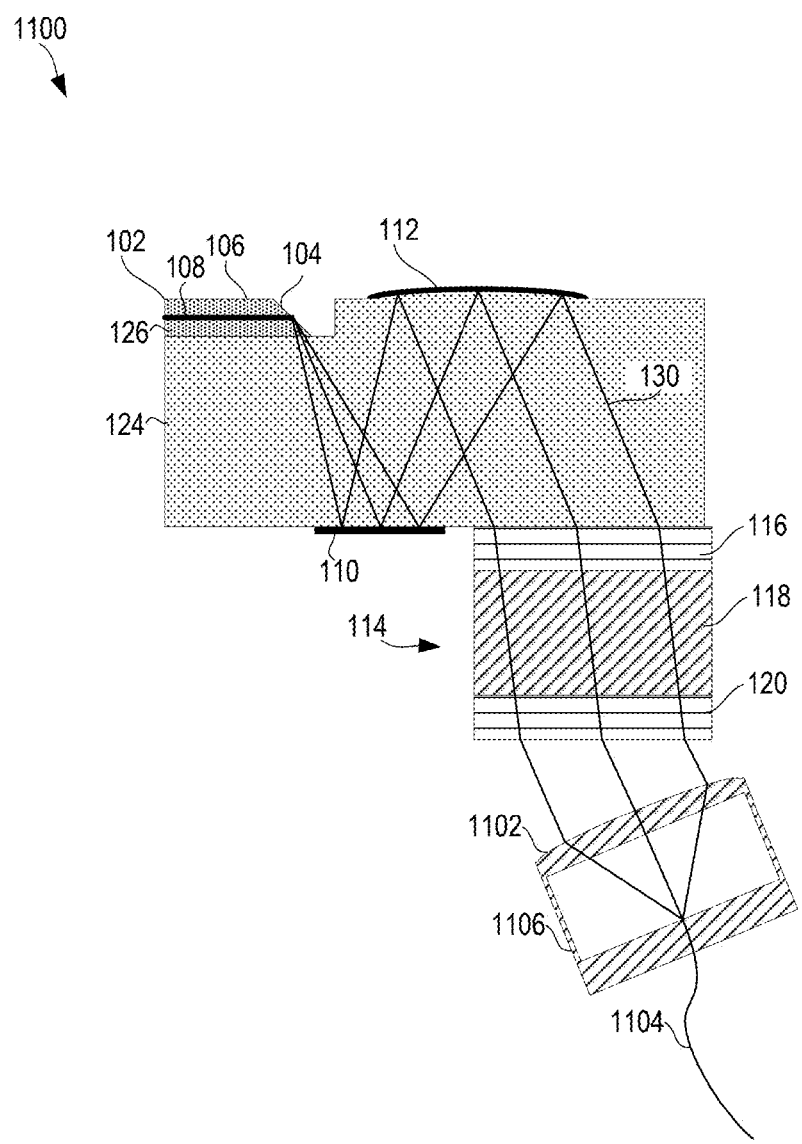
FIG. 11 is a cross-sectional view of a system including a photonic integrated circuit die.

Referring now to FIGS. 11, in one embodiment, a system 1100 includes a photonic integrated circuit (PIC) die 102. FIG. 11 shows a cross-sectional view of the system 1100. The system 1100 is similar to the system 100, but in place of the second PIC die 132 is an array of lenses 1102 that focus the beams 130 into fibers 1104. The fibers 1104 may then carry the beams 130 to another component (or deliver beams from another component to the PIC die 132). A housing 1106 holds the fiber 1104 in place relative to the lens 1102.

Figure 12:
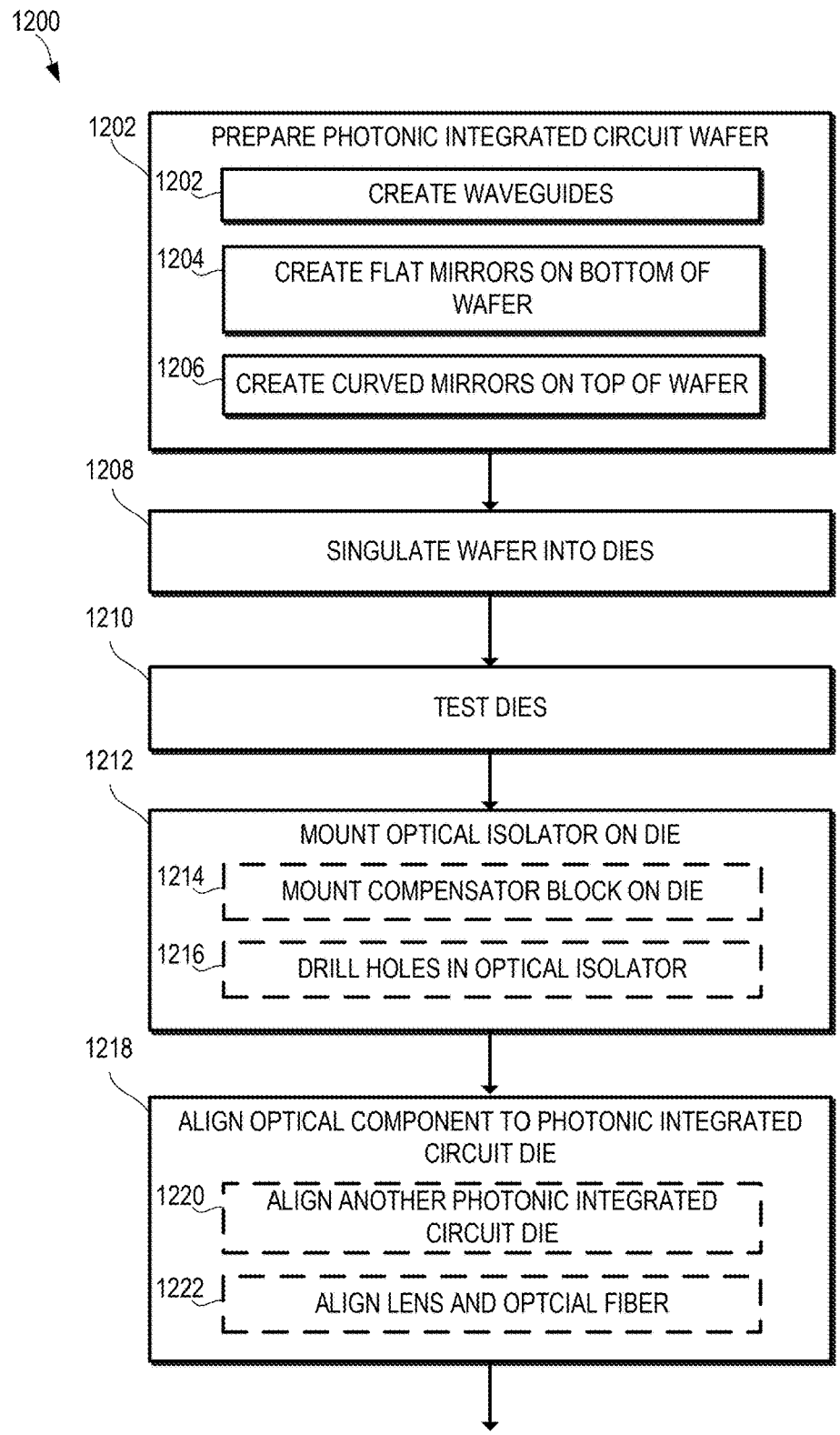
FIG. 12 is a simplified flow diagram of at least one embodiment of a method for manufacturing a photonic integrated circuit.

Referring now to FIG. 12, in one embodiment, a flowchart for a method 1200 for creating the system 100, 400, 600, 800, or 1100 with a PIC die 102 is shown. The method 1200 may be executed by a technician and/or by one or more automated machines. In some embodiments, one or more machines may be programmed to do some or all of the steps of the method 1200. Such a machine may include, e.g., a memory, a processor, data storage, etc. The memory and/or data storage may store instructions that, when executed by the machine, causes the machine to perform some or all of the steps of the method 1200. The method 1200 may use any suitable set of techniques that are used in semiconductor processing, such as chemical vapor deposition, atomic layer deposition, physical layer deposition, molecular beam epitaxy, layer transfer, photolithography, ion implantation, dry etching, wet etching, thermal treatments, flip chip, layer transfer, magnetron sputter deposition, pulsed laser deposition, etc. It should be appreciated that the method 1200 is merely one embodiment of a method to create the system 100, 400, 600, 800, or 1100, and other methods may be used to create the system 100, 400, 600, 800, or 1100. In some embodiments, steps of the method 1200 may be performed in a different order than that shown in the flowchart.

The method 1200 begins in block 1202, in which a wafer of photonic integrated circuits is prepared. The wafer may include, e.g., lasers or other light sources, optical detectors, filters, splitters, electrical connections, etc. As part of preparing the wafer, waveguides 108 are created in block 1202. In block 1204, mirrors 110 are created on the bottom surface of the wafer. In block 1206, curved mirrors 112 are created on top of the wafer. Curved mirrors 112 may be created from the substrate using any suitable techniques, such as grayscale photolithography or resist reflow.

In block 1208, the wafer is singulated into several PIC dies 102 (and/or several PIC dies 132). In block 1208, in some embodiments, the PIC dies 102 are individually tested, such as by providing power to the PIC die 102 and testing operation of the photonic integrated circuit and/or alignment of the beams 130. PIC dies 102 that are faulty can be discarded at this stage, preventing any PIC die 102 from being incorporated into a package or other component, which would then reduce the yield of the packaging process. In some embodiments, the individual PIC dies 102 may be tested at the wafer level before singulation.

In block 1212, an optical isolator 114 is mounted on the PIC die 102. In some embodiments, a compensator block 122 is mounted on the PIC die 102 in block 1214. Additionally or alternatively, in some embodiments, holes 602 are drilled in the optical isolator 114.

In block 1218, an optical component is aligned to the PIC die 102 to couple to the beam 130. In one embodiment, another PIC die 132 is aligned to the beam 130 in block 1220. In another embodiment, a lens 1102 and optical fiber 1104 are aligned to the beam 130 in block 1222.

Before or after another optical component is aligned to the PIC die 102, in some embodiments, the PIC dies 102 may be placed on a circuit board, integrated into a package, possibly with one or more other components, or used in any other suitable manner.

Figure 13:
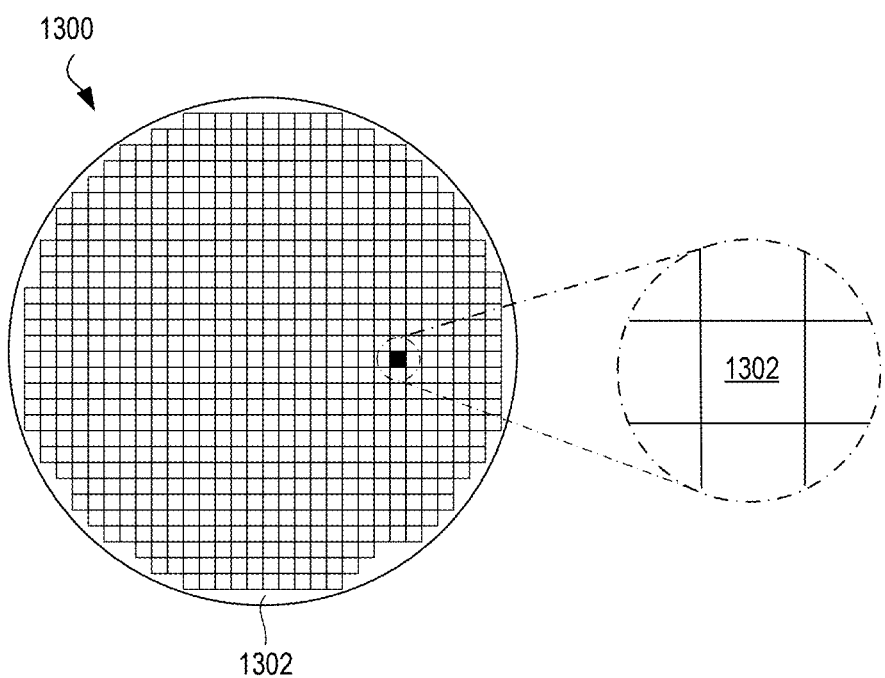
FIG. 13 is a top view of a wafer and dies that may be included in a microelectronic assembly, in accordance with any of the embodiments disclosed herein.

FIG. 13 is a top view of a wafer 1300 and dies 1302 that may be included in any of the systems 100 disclosed herein (e.g., as any suitable ones of the PIC dies 102). The wafer 1300 may be composed of semiconductor material and may include one or more dies 1302 having integrated circuit structures formed on a surface of the wafer 1300. The individual dies 1302 may be a repeating unit of an integrated circuit product that includes any suitable integrated circuit. After the fabrication of the semiconductor product is complete, the wafer 1300 may undergo a singulation process in which the dies 1302 are separated from one another to provide discrete "chips" of the integrated circuit product. The die 1302 may be any of the PIC dies 102 disclosed herein. The die 1302 may include one or more transistors (e.g., some of the transistors 1440 of FIG. 14, discussed below), supporting circuitry to route electrical signals to the transistors, passive components (e.g., signal traces, resistors, capacitors, or inductors), and/or any other integrated circuit components. In some embodiments, the wafer 1300 or the die 1302 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1302. For example, a memory array formed by multiple memory devices may be formed on a same die 1302 as a processor unit (e.g., the processor unit 1702 of FIG. 17) or other logic that is configured to store information in the memory devices or execute instructions stored in the memory array. Various ones of the systems 100, 300, etc. disclosed herein may be manufactured using a die-to-wafer assembly technique in which some PIC dies 102 are attached to a wafer 1300 that include others of the PIC dies 102, and the wafer 1300 is subsequently singulated.

Figure 14:
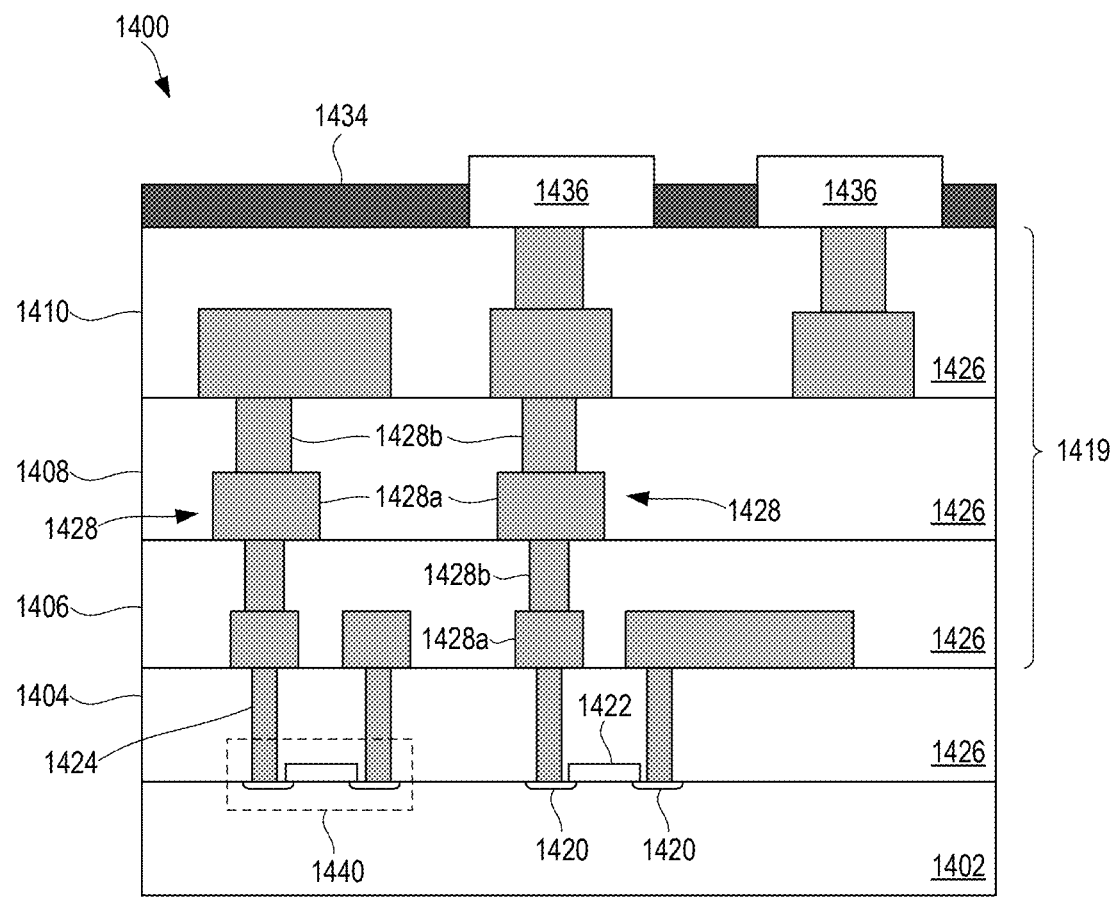
FIG. 14 is a cross-sectional side view of an integrated circuit device that may be included in a microelectronic assembly, in accordance with any of the embodiments disclosed herein.

FIG. 14 is a cross-sectional side view of an integrated circuit device 1400 that may be included in any of the systems disclosed herein (e.g., in any of the PIC dies 102). One or more of the integrated circuit devices 1400 may be included in one or more dies 1302 (FIG. 13). The integrated circuit device 1400 may be formed on a die substrate 1402 (e.g., the wafer 1300 of FIG. 13) and may be included in a die (e.g., the die 1302 of FIG. 13). The die substrate 1402 may be a semiconductor substrate composed of semiconductor material systems including, for example, n-type or p-type materials systems (or a combination of both). The die substrate 1402 may include, for example, a crystalline substrate formed using a bulk silicon or a silicon-on-insulator (SOI) substructure. In some embodiments, the die substrate 1402 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 1402. Although a few examples of materials from which the die substrate 1402 may be formed are described here, any material that may serve as a foundation for an integrated circuit device 1400 may be used. The die substrate 1402 may be part of a singulated die (e.g., the dies 1302 of FIG. 13) or a wafer (e.g., the wafer 1300 of FIG. 13).

The integrated circuit device 1400 may include one or more device layers 1404 disposed on the die substrate 1402. The device layer 1404 may include features of one or more transistors 1440 (e.g., metal oxide semiconductor field-effect transistors (MOSFETs)) formed on the die substrate 1402. The transistors 1440 may include, for example, one or more source and/or drain (S/D) regions 1420, a gate 1422 to control current flow between the S/D regions 1420, and one or more S/D contacts 1424 to route electrical signals to/from the S/D regions 1420. The transistors 1440 may include additional features not depicted for the sake of clarity, such as device isolation regions, gate contacts, and the like. The transistors 1440 are not limited to the type and configuration depicted in FIG. 14 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

FIGS. 15A-15D are simplified perspective views of example planar, FinFET, gate-all-around, and stacked gate-all-around transistors. The transistors illustrated in FIGS. 15A-15D are formed on a substrate 1516 having a surface 1508. Isolation regions 1514 separate the source and drain regions of the transistors from other transistors and from a bulk region 1518 of the substrate 1516.

Figure 15B:
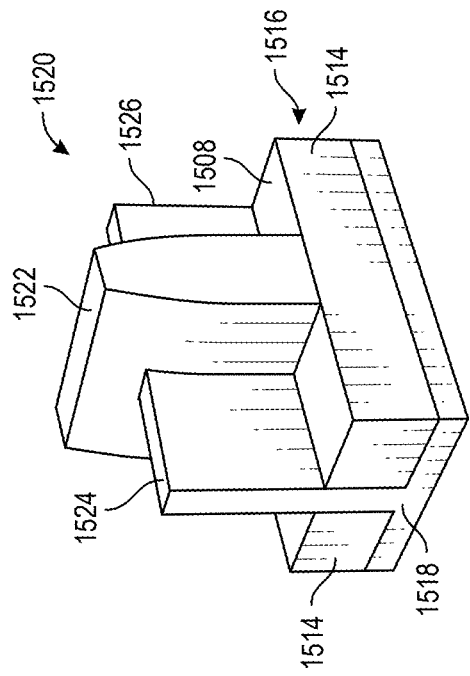
FIGS. 15A-15D are perspective views of example planar, gate-all-around, and stacked gate-all-around transistors.
Figure 15D:
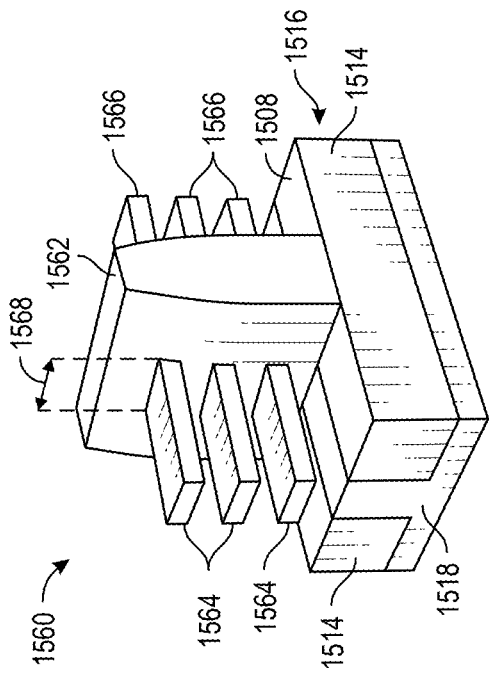
Figure 15A:
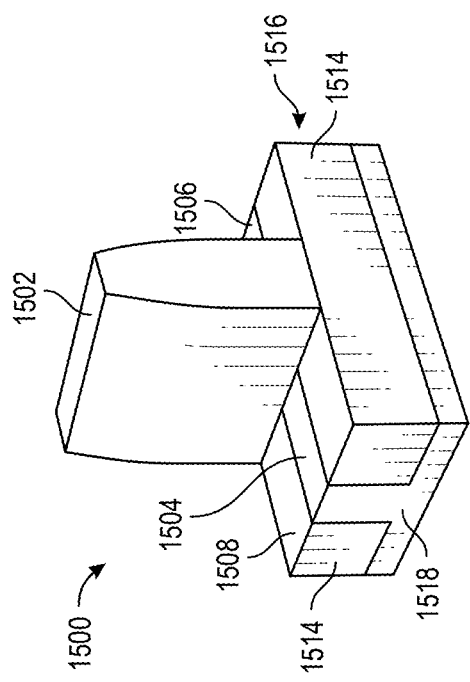

FIG. 15A is a perspective view of an example planar transistor 1500 comprising a gate 1502 that controls current flow between a source region 1504 and a drain region 1506. The transistor 1500 is planar in that the source region 1504 and the drain region 1506 are planar with respect to the substrate surface 1508.

FIG. 15B is a perspective view of an example FinFET transistor 1520 comprising a gate 1522 that controls current flow between a source region 1524 and a drain region 1526. The transistor 1520 is non-planar in that the source region 1524 and the drain region 1526 comprise "fins" that extend upwards from the substrate surface 1528. As the gate 1522 encompasses three sides of the semiconductor fin that extends from the source region 1524 to the drain region 1526, the transistor 1520 can be considered a tri-gate transistor. FIG. 15B illustrates one S/D fin extending through the gate 1522, but multiple S/D fins can extend through the gate of a FinFET transistor.

Figure 15C:
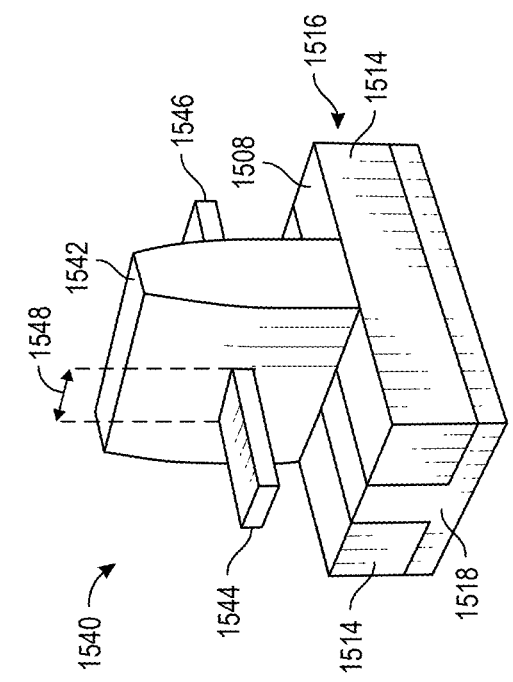

FIG. 15C is a perspective view of a gate-all-around (GAA) transistor 1540 comprising a gate 1542 that controls current flow between a source region 1544 and a drain region 1546. The transistor 1540 is non-planar in that the source region 1544 and the drain region 1546 are elevated from the substrate surface 1528.

FIG. 15D is a perspective view of a GAA transistor 1560 comprising a gate 1562 that controls current flow between multiple elevated source regions 1564 and multiple elevated drain regions 1566. The transistor 1560 is a stacked GAA transistor as the gate controls the flow of current between multiple elevated S/D regions stacked on top of each other. The transistors 1540 and 1560 are considered gate-all-around transistors as the gates encompass all sides of the semiconductor portions that extends from the source regions to the drain regions. The transistors 1540 and 1560 can alternatively be referred to as nanowire, nanosheet, or nanoribbon transistors depending on the width (e.g., widths 1548 and 1568 of transistors 1540 and 1560, respectively) of the semiconductor portions extending through the gate.

Returning to FIG. 14, a transistor 1440 may include a gate 1422 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1440 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1440 along the source-channel-drain direction, the gate electrode may consist of a U-shaped structure that includes a bottom portion substantially parallel to the surface of the die substrate 1402 and two sidewall portions that are substantially perpendicular to the top surface of the die substrate 1402. In other embodiments, at least one of the metal layers that form the gate electrode may simply be a planar layer that is substantially parallel to the top surface of the die substrate 1402 and does not include sidewall portions substantially perpendicular to the top surface of the die substrate 1402. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1420 may be formed within the die substrate 1402 adjacent to the gate 1422 of individual transistors 1440. The S/D regions 1420 may be formed using an implantation/diffusion process or an etching/deposition process, for example. In the former process, dopants such as boron, aluminum, antimony, phosphorous, or arsenic may be ion-implanted into the die substrate 1402 to form the S/D regions 1420. An annealing process that activates the dopants and causes them to diffuse farther into the die substrate 1402 may follow the ion-implantation process. In the latter process, the die substrate 1402 may first be etched to form recesses at the locations of the S/D regions 1420. An epitaxial deposition process may then be carried out to fill the recesses with material that is used to fabricate the S/D regions 1420. In some implementations, the S/D regions 1420 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1420 may be formed using one or more alternate semiconductor materials such as germanium or a group III-V material or alloy. In further embodiments, one or more layers of metal and/or metal alloys may be used to form the S/D regions 1420.

Electrical signals, such as power and/or input/output (I/O) signals, may be routed to and/or from the devices (e.g., transistors 1440) of the device layer 1404 through one or more interconnect layers disposed on the device layer 1404 (illustrated in FIG. 14 as interconnect layers 1406-1410). For example, electrically conductive features of the device layer 1404 (e.g., the gate 1422 and the S/D contacts 1424) may be electrically coupled with the interconnect structures 1428 of the interconnect layers 1406-1410. The one or more interconnect layers 1406-1410 may form a metallization stack (also referred to as an "ILD stack") 1419 of the integrated circuit device 1400.

The interconnect structures 1428 may be arranged within the interconnect layers 1406-1410 to route electrical signals according to a wide variety of designs; in particular, the arrangement is not limited to the particular configuration of interconnect structures 1428 depicted in FIG. 14. Although a particular number of interconnect layers 1406-1410 is depicted in FIG. 14, embodiments of the present disclosure include integrated circuit devices having more or fewer interconnect layers than depicted.

In some embodiments, the interconnect structures 1428 may include lines 1428a and/or vias 1428b filled with an electrically conductive material such as a metal. The lines 1428a may be arranged to route electrical signals in a direction of a plane that is substantially parallel with a surface of the die substrate 1402 upon which the device layer 1404 is formed. The vias 1428b may be arranged to route electrical signals in a direction of a plane that is substantially perpendicular to the surface of the die substrate 1402 upon which the device layer 1404 is formed. In some embodiments, the vias 1428b may electrically couple lines 1428a of different interconnect layers 1406-1410 together.

The interconnect layers 1406-1410 may include a dielectric material 1426 disposed between the interconnect structures 1428, as shown in FIG. 14. In some embodiments, dielectric material 1426 disposed between the interconnect structures 1428 in different ones of the interconnect layers 1406-1410 may have different compositions; in other embodiments, the composition of the dielectric material 1426 between different interconnect layers 1406-1410 may be the same. The device layer 1404 may include a dielectric material 1426 disposed between the transistors 1440 and a bottom layer of the metallization stack as well. The dielectric material 1426 included in the device layer 1404 may have a different composition than the dielectric material 1426 included in the interconnect layers 1406-1410; in other embodiments, the composition of the dielectric material 1426 in the device layer 1404 may be the same as a dielectric material 1426 included in any one of the interconnect layers 1406-1410.

A first interconnect layer 1406 (referred to as Metal 1 or "M1") may be formed directly on the device layer 1404. In some embodiments, the first interconnect layer 1406 may include lines 1428a and/or vias 1428b, as shown. The lines 1428a of the first interconnect layer 1406 may be coupled with contacts (e.g., the S/D contacts 1424) of the device layer 1404. The vias 1428b of the first interconnect layer 1406 may be coupled with the lines 1428a of a second interconnect layer 1408.

The second interconnect layer 1408 (referred to as Metal 2 or "M2") may be formed directly on the first interconnect layer 1406. In some embodiments, the second interconnect layer 1408 may include via 1428b to couple the lines 1428 of the second interconnect layer 1408 with the lines 1428a of a third interconnect layer 1410. Although the lines 1428a and the vias 1428b are structurally delineated with a line within individual interconnect layers for the sake of clarity, the lines 1428a and the vias 1428b may be structurally and/or materially contiguous (e.g., simultaneously filled during a dual-damascene process) in some embodiments.

The third interconnect layer 1410 (referred to as Metal 3 or "M3") (and additional interconnect layers, as desired) may be formed in succession on the second interconnect layer 1408 according to similar techniques and configurations described in connection with the second interconnect layer 1408 or the first interconnect layer 1406. In some embodiments, the interconnect layers that are "higher up" in the metallization stack 1419 in the integrated circuit device 1400 (i.e., farther away from the device layer 1404) may be thicker that the interconnect layers that are lower in the metallization stack 1419, with lines 1428a and vias 1428b in the higher interconnect layers being thicker than those in the lower interconnect layers.

The integrated circuit device 1400 may include a solder resist material 1434 (e.g., polyimide or similar material) and one or more conductive contacts 1436 formed on the interconnect layers 1406-1410. In FIG. 14, the conductive contacts 1436 are illustrated as taking the form of bond pads. The conductive contacts 1436 may be electrically coupled with the interconnect structures 1428 and configured to route the electrical signals of the transistor(s) 1440 to external devices. For example, solder bonds may be formed on the one or more conductive contacts 1436 to mechanically and/or electrically couple an integrated circuit die including the integrated circuit device 1400 with another component (e.g., a printed circuit board). The integrated circuit device 1400 may include additional or alternate structures to route the electrical signals from the interconnect layers 1406-1410; for example, the conductive contacts 1436 may include other analogous features (e.g., posts) that route the electrical signals to external components.

In some embodiments in which the integrated circuit device 1400 is a double-sided die, the integrated circuit device 1400 may include another metallization stack (not shown) on the opposite side of the device layer(s) 1404. This metallization stack may include multiple interconnect layers as discussed above with reference to the interconnect layers 1406-1410, to provide conductive pathways (e.g., including conductive lines and vias) between the device layer(s) 1404 and additional conductive contacts (not shown) on the opposite side of the integrated circuit device 1400 from the conductive contacts 1436.

In other embodiments in which the integrated circuit device 1400 is a double-sided die, the integrated circuit device 1400 may include one or more through silicon vias (TSVs) through the die substrate 1402; these TSVs may make contact with the device layer(s) 1404, and may provide conductive pathways between the device layer(s) 1404 and additional conductive contacts (not shown) on the opposite side of the integrated circuit device 1400 from the conductive contacts 1436. In some embodiments, TSVs extending through the substrate can be used for routing power and ground signals from conductive contacts on the opposite side of the integrated circuit device 1400 from the conductive contacts 1436 to the transistors 1440 and any other components integrated into the die 1400, and the metallization stack 1419 can be used to route I/O signals from the conductive contacts 1436 to transistors 1440 and any other components integrated into the die 1400.

Multiple integrated circuit devices 1400 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 16:
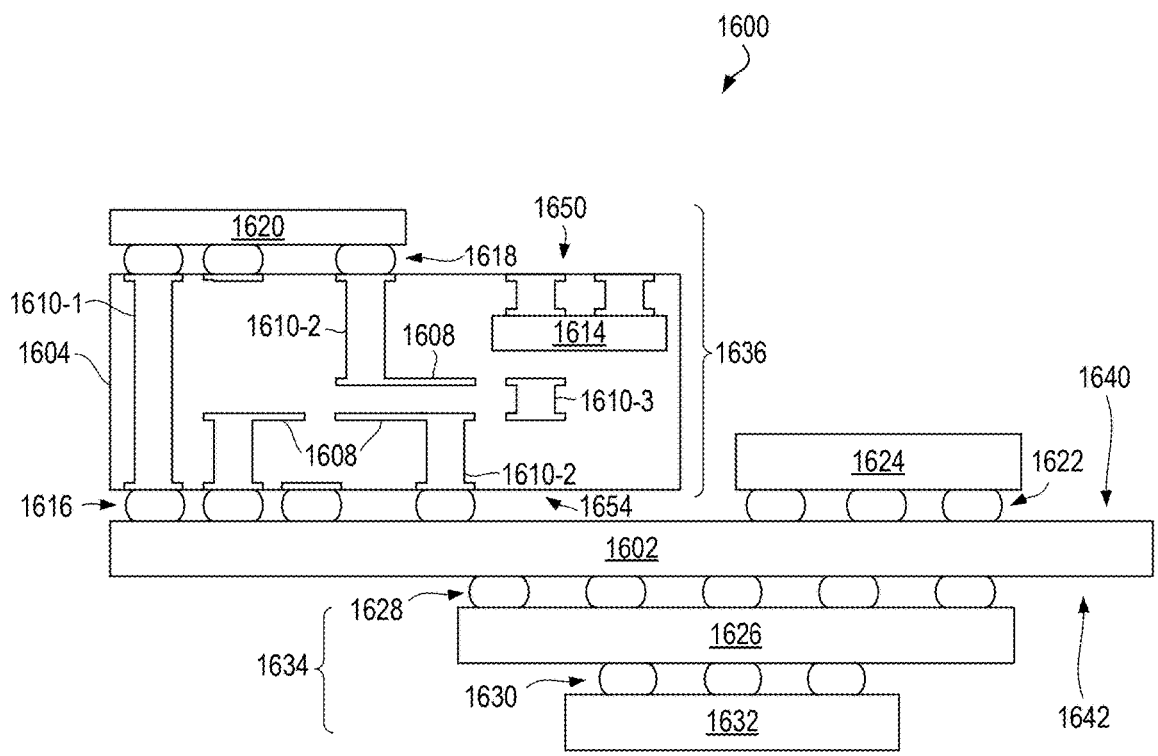
FIG. 16 is a cross-sectional side view of an integrated circuit device assembly that may include a microelectronic assembly, in accordance with any of the embodiments disclosed herein.

FIG. 16 is a cross-sectional side view of an integrated circuit device assembly 1600. The integrated circuit device assembly 1600 includes a number of components disposed on a circuit board 1602 (which may be a motherboard, system board, mainboard, etc.). The integrated circuit device assembly 1600 includes components disposed on a first face 1640 of the circuit board 1602 and an opposing second face 1642 of the circuit board 1602; generally, components may be disposed on one or both faces 1640 and 1642. Any of the integrated circuit components discussed below with reference to the integrated circuit device assembly 1600 may take the form of any suitable ones of the embodiments of the systems disclosed herein.

In some embodiments, the circuit board 1602 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 1602. In other embodiments, the circuit board 1602 may be a non-PCB substrate. The integrated circuit device assembly 1600 illustrated in FIG. 16 includes a package-on-interposer structure 1636 coupled to the first face 1640 of the circuit board 1602 by coupling components 1616. The coupling components 1616 may electrically and mechanically couple the package-on-interposer structure 1636 to the circuit board 1602, and may include solder balls (as shown in FIG. 16), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 1636 may include an integrated circuit component 1620 coupled to an interposer 1604 by coupling components 1618. The coupling components 1618 may take any suitable form for the application, such as the forms discussed above with reference to the coupling components 1616. Although a single integrated circuit component 1620 is shown in FIG. 16, multiple integrated circuit components may be coupled to the interposer 1604; indeed, additional interposers may be coupled to the interposer 1604. The interposer 1604 may provide an intervening substrate used to bridge the circuit board 1602 and the integrated circuit component 1620.

The integrated circuit component 1620 may be a packaged or unpacked integrated circuit product that includes one or more integrated circuit dies (e.g., the die 1302 of FIG. 13, the integrated circuit device 1400 of FIG. 14) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1620, a single monolithic integrated circuit die comprises solder bumps attached to contacts on the die. The solder bumps allow the die to be directly attached to the interposer 1604. The integrated circuit component 1620 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 1620 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 1620 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 1620 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 1604 may spread connections to a wider pitch or reroute a connection to a different connection. For example, the interposer 1604 may couple the integrated circuit component 1620 to a set of ball grid array (BGA) conductive contacts of the coupling components 1616 for coupling to the circuit board 1602. In the embodiment illustrated in FIG. 16, the integrated circuit component 1620 and the circuit board 1602 are attached to opposing sides of the interposer 1604; in other embodiments, the integrated circuit component 1620 and the circuit board 1602 may be attached to a same side of the interposer 1604. In some embodiments, three or more components may be interconnected by way of the interposer 1604.

In some embodiments, the interposer 1604 may be formed as a PCB, including multiple metal layers separated from one another by layers of dielectric material and interconnected by electrically conductive vias. In some embodiments, the interposer 1604 may be formed of an epoxy resin, a fiberglass-reinforced epoxy resin, an epoxy resin with inorganic fillers, a ceramic material, or a polymer material such as polyimide. In some embodiments, the interposer 1604 may be formed of alternate rigid or flexible materials that may include the same materials described above for use in a semiconductor substrate, such as silicon, germanium, and other group III-V and group IV materials. The interposer 1604 may include metal interconnects 1608 and vias 1610, including but not limited to through hole vias 1610-1 (that extend from a first face 1650 of the interposer 1604 to a second face 1654 of the interposer 1604), blind vias 1610-2 (that extend from the first or second faces 1650 or 1654 of the interposer 1604 to an internal metal layer), and buried vias 1610-3 (that connect internal metal layers).

In some embodiments, the interposer 1604 can comprise a silicon interposer. Through silicon vias (TSV) extending through the silicon interposer can connect connections on a first face of a silicon interposer to an opposing second face of the silicon interposer. In some embodiments, an interposer 1604 comprising a silicon interposer can further comprise one or more routing layers to route connections on a first face of the interposer 1604 to an opposing second face of the interposer 1604.

The interposer 1604 may further include embedded devices 1614, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1604. The package-on-interposer structure 1636 may take the form of any of the package-on-interposer structures known in the art. In embodiments where the interposer is a non-printed circuit board The integrated circuit device assembly 1600 may include an integrated circuit component 1624 coupled to the first face 1640 of the circuit board 1602 by coupling components 1622. The coupling components 1622 may take the form of any of the embodiments discussed above with reference to the coupling components 1616, and the integrated circuit component 1624 may take the form of any of the embodiments discussed above with reference to the integrated circuit component 1620.

The integrated circuit device assembly 1600 illustrated in FIG. 16 includes a package-on-package structure 1634 coupled to the second face 1642 of the circuit board 1602 by coupling components 1628. The package-on-package structure 1634 may include an integrated circuit component 1626 and an integrated circuit component 1632 coupled together by coupling components 1630 such that the integrated circuit component 1626 is disposed between the circuit board 1602 and the integrated circuit component 1632. The coupling components 1628 and 1630 may take the form of any of the embodiments of the coupling components 1616 discussed above, and the integrated circuit components 1626 and 1632 may take the form of any of the embodiments of the integrated circuit component 1620 discussed above. The package-on-package structure 1634 may be configured in accordance with any of the package-on-package structures known in the art.

Figure 17:
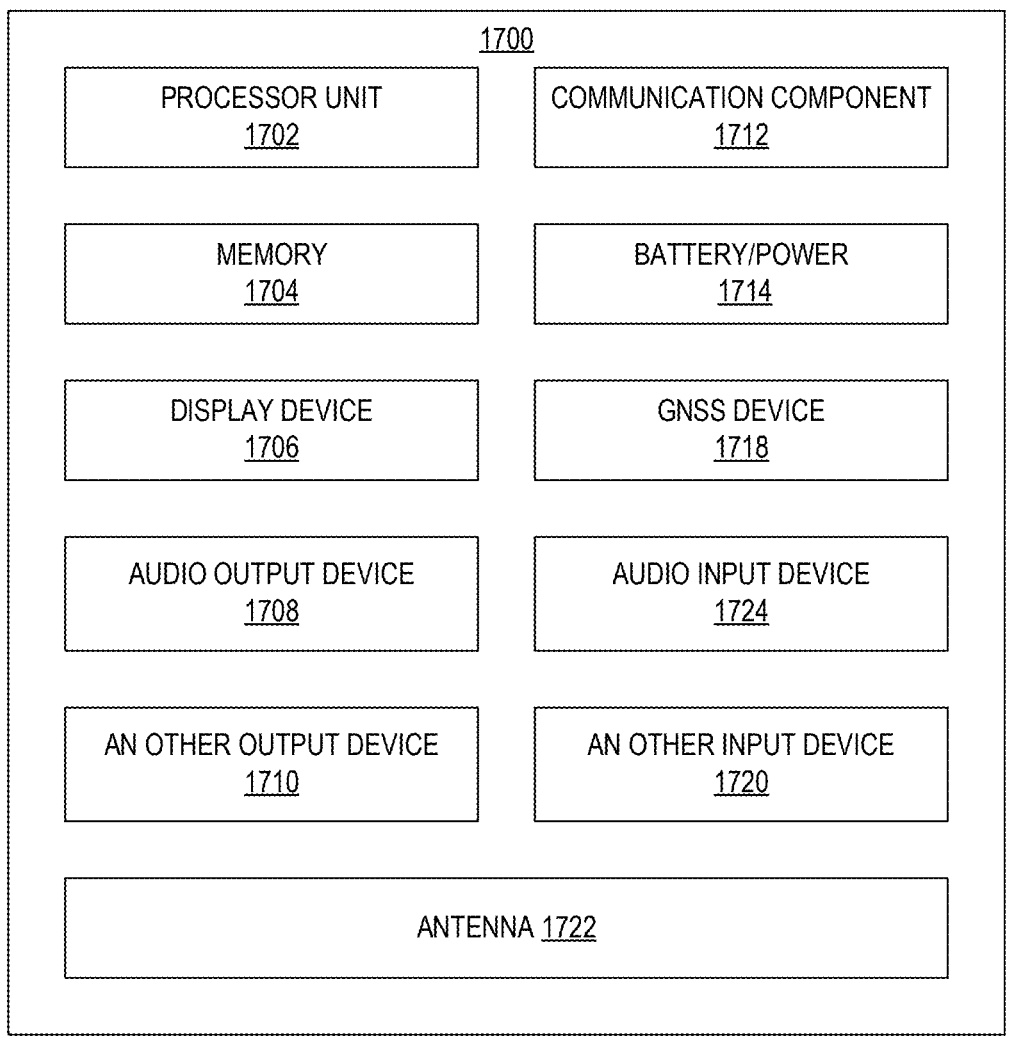
FIG. 17 is a block diagram of an example electrical device that may include a microelectronic assembly, in accordance with any of the embodiments disclosed herein.

FIG. 17 is a block diagram of an example electrical device 1700 that may include one or more of the systems 100, 300, etc. disclosed herein. For example, any suitable ones of the components of the electrical device 1700 may include one or more of the integrated circuit device assemblies 1600, integrated circuit components 1620, integrated circuit devices 1400, or integrated circuit dies 1302 disclosed herein, and may be arranged in any of the systems 100, 300, etc. disclosed herein. A number of components are illustrated in FIG. 17 as included in the electrical device 1700, but any one or more of these components may be omitted or duplicated, as suitable for the application. In some embodiments, some or all of the components included in the electrical device 1700 may be attached to one or more motherboards mainboards, or system boards. In some embodiments, one or more of these components are fabricated onto a single system-on-a-chip (SoC) die.

Additionally, in various embodiments, the electrical device 1700 may not include one or more of the components illustrated in FIG. 17, but the electrical device 1700 may include interface circuitry for coupling to the one or more components. For example, the electrical device 1700 may not include a display device 1706, but may include display device interface circuitry (e.g., a connector and driver circuitry) to which a display device 1706 may be coupled. In another set of examples, the electrical device 1700 may not include an audio input device 1724 or an audio output device 1708, but may include audio input or output device interface circuitry (e.g., connectors and supporting circuitry) to which an audio input device 1724 or audio output device 1708 may be coupled.

The electrical device 1700 may include one or more processor units 1702 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 1702 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 1700 may include a memory 1704, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 1704 may include memory that is located on the same integrated circuit die as the processor unit 1702. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 1700 can comprise one or more processor units 1702 that are heterogeneous or asymmetric to another processor unit 1702 in the electrical device 1700. There can be a variety of differences between the processing units 1702 in a system in terms of a spectrum of metrics of merit including architectural, micro-architectural, thermal, power consumption characteristics, and the like. These differences can effectively manifest themselves as asymmetry and heterogeneity among the processor units 1702 in the electrical device 1700.

In some embodiments, the electrical device 1700 may include a communication component 1712 (e.g., one or more communication components). For example, the communication component 1712 can manage wireless communications for the transfer of data to and from the electrical device 1700. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 1712 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 1712 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 1712 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 1712 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 1712 may operate in accordance with other wireless protocols in other embodiments. The electrical device 1700 may include an antenna 1722 to facilitate wireless communications and/or to receive other wireless communications (such as AM or FM radio transmissions).

In some embodiments, the communication component 1712 may manage wired communications, such as electrical, optical, or any other suitable communication protocols (e.g., IEEE 802.3 Ethernet standards). As noted above, the communication component 1712 may include multiple communication components. For instance, a first communication component 1712 may be dedicated to shorter-range wireless communications such as Wi-Fi or Bluetooth, and a second communication component 1712 may be dedicated to longer-range wireless communications such as global positioning system (GPS), EDGE, GPRS, CDMA, WiMAX, LTE, EV-DO, or others. In some embodiments, a first communication component 1712 may be dedicated to wireless communications, and a second communication component 1712 may be dedicated to wired communications.

The electrical device 1700 may include battery/power circuitry 1714. The battery/power circuitry 1714 may include one or more energy storage devices (e.g., batteries or capacitors) and/or circuitry for coupling components of the electrical device 1700 to an energy source separate from the electrical device 1700 (e.g., AC line power).

The electrical device 1700 may include a display device 1706 (or corresponding interface circuitry, as discussed above). The display device 1706 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 1700 may include an audio output device 1708 (or corresponding interface circuitry, as discussed above). The audio output device 1708 may include any embedded or wired or wirelessly connected external device that generates an audible indicator, such speakers, headsets, or earbuds.

The electrical device 1700 may include an audio input device 1724 (or corresponding interface circuitry, as discussed above). The audio input device 1724 may include any embedded or wired or wirelessly connected device that generates a signal representative of a sound, such as microphones, microphone arrays, or digital instruments (e.g., instruments having a musical instrument digital interface (MIDI) output). The electrical device 1700 may include a Global Navigation Satellite System (GNSS) device 1718 (or corresponding interface circuitry, as discussed above), such as a Global Positioning System (GPS) device. The GNSS device 1718 may be in communication with a satellite-based system and may determine a geolocation of the electrical device 1700 based on information received from one or more GNSS satellites, as known in the art.

The electrical device 1700 may include an other output device 1710 (or corresponding interface circuitry, as discussed above). Examples of the other output device 1710 may include an audio codec, a video codec, a printer, a wired or wireless transmitter for providing information to other devices, or an additional storage device.

The electrical device 1700 may include an other input device 1720 (or corresponding interface circuitry, as discussed above). Examples of the other input device 1720 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 1700 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 1700 may be any other electronic device that processes data. In some embodiments, the electrical device 1700 may comprise multiple discrete physical components. Given the range of devices that the electrical device 1700 can be manifested as in various embodiments, in some embodiments, the electrical device 1700 can be referred to as a computing device or a computing system.

EXAMPLES

Illustrative examples of the technologies disclosed herein are provided below. An embodiment of the technologies may include any one or more, and any combination of, the examples described below.

Example 1 includes an apparatus comprising a photonic integrated circuit (PIC) die comprising one or more waveguides, wherein the one or more waveguides are disposed near a top surface of the PIC die; one or more flat mirrors disposed on a bottom surface of the PIC die, the bottom surface opposite the top surface; one or more curved mirrors; and one or more reflectors, wherein individual reflectors of the one or more reflectors are to reflect light from the one or more waveguides towards one of the one or more flat mirrors; and an optical isolator, wherein individual flat mirrors of the one or more flat mirrors are to reflect light from one of the one or more reflectors towards one of the one or more curved mirrors, wherein individual curved mirrors of the one or more curved mirrors reflect light from one of the flat mirrors of the one or more flat mirrors towards the optical isolator.

Example 2 includes the subject matter of Example 1, and further including a compensator block, wherein a first set of waveguides of the one or more waveguides are transmit waveguides to transmit light, wherein a second set of waveguides of the one or more waveguides are receive waveguides to receive light, wherein a beam of light from a waveguide of the first set of waveguides is to pass through the optical isolator, wherein a beam of light to a waveguide of the second set of waveguides is to pass through the compensator block, wherein the compensator block causes a displacement to a beam about the same as a displacement to a beam caused by the optical isolator.

Example 3 includes the subject matter of any of Examples 1 and 2, and further including a compensator block, wherein a first set of waveguides of the one or more waveguides are transmit waveguides to transmit light, wherein a second set of waveguides of the one or more waveguides are receive waveguides to receive light, wherein individual waveguides of the first set of waveguides end at a first reflector, wherein individual waveguides of the second set of waveguides end at a second reflector, wherein the ends of the first set of waveguides are on a first line, wherein the ends of the second set of waveguides are on a second line, wherein the second line is offset relative to the first line.

Example 4 includes the subject matter of any of Examples 1-3, and further including a compensator block, wherein a first set of waveguides of the one or more waveguides are transmit waveguides to transmit light, wherein a second set of waveguides of the one or more waveguides are receive waveguides to receive light, wherein the first set of waveguides and the second set of waveguides are interleaved to form one or more pairs of waveguides, wherein individual pairs of the one or more pairs of waveguides comprise a transmit waveguide and a receive waveguide.

Example 5 includes the subject matter of any of Examples 1-4, and wherein the optical isolator has one or more holes in it for light to pass through to receive waveguides of the one or more pairs of waveguides.

Example 6 includes the subject matter of any of Examples 1-5, and wherein individual waveguides of the first set of waveguides end at a first reflector, wherein individual waveguides of the second set of waveguides end at a second reflector, wherein the ends of the first set of waveguides are on a first line, wherein the ends of the second set of waveguides are on a second line, wherein the second line is offset relative to the first line, wherein light from the first set of waveguides passes through the optical isolator, wherein light to the second set of waveguides does not pass through the optical isolator.

Example 7 includes the subject matter of any of Examples 1-6, and further including one or more optical fibers; and one or more lenses, wherein individual lenses of the one or more lenses are to focus light from the PIC die that passes through the optical isolator into one of the one or more optical fibers.

Example 8 includes the subject matter of any of Examples 1-7, and further including a second PIC die comprising one or more waveguides, wherein the one or more waveguides of the second PIC die are disposed near a bottom surface of the second PIC die; one or more flat mirrors disposed on a top surface of the second PIC die, the top surface of the second PIC die opposite the bottom surface of the second PIC die; one or more curved mirrors; and one or more reflectors, wherein individual reflectors of the one or more reflectors of the second PIC die are to reflect light from the one or more curved mirrors of the second PIC die to one or more waveguides of the second PIC die, wherein individual curved mirrors of the one or more curved mirrors of the second PIC die reflect light from the PIC die that passes through the optical isolator towards one of the one or more flat mirrors of the second PIC die, wherein individual flat mirrors of the one or more flat mirrors of the second PIC die are to reflect light from one of the one or more curved mirrors of the second PIC die towards one of the one or more reflectors of the second PIC die.

Example 9 includes the subject matter of any of Examples 1-8, and wherein the one or more curved mirrors are to collimate light from the one or more waveguides.

Example 10 includes the subject matter of any of Examples 1-9, and wherein the one or more curved mirrors are to collimate light from the one or more waveguides into beams with a beam width between 50 and 200 micrometers.

Example 11 includes the subject matter of any of Examples 1-10, and wherein the one or more curved mirrors extend past a plane defined by the top surface of the PIC die.

Example 12 includes the subject matter of any of Examples 1-11, and wherein the one or more curved mirrors extend past the plane defined by the top surface of the PIC die by 0.5-10 micrometers.

Example 13 includes the subject matter of any of Examples 1-12, and wherein the PIC die comprises silicon, wherein the one or more curved mirrors comprise silicon.

Example 14 includes the subject matter of any of Examples 1-13, and further including a circuit board, wherein the PIC die is mated to the circuit board; and one or more electrical integrated circuits mated to the circuit board.

Example 15 includes a system comprising a first photonic integrated circuit (PIC) die comprising one or more waveguides, wherein the one or more waveguides of the first PIC die are disposed near a top surface of the first PIC die; one or more flat mirrors disposed on a bottom surface of the first PIC die, the bottom surface of the first PIC die opposite the top surface of the first PIC die; one or more curved mirrors; and one or more reflectors; and a second PIC die comprising one or more waveguides, wherein the one or more waveguides of the second PIC die are disposed near a bottom surface of the second PIC die; one or more flat mirrors disposed on a top surface of the second PIC die, the top surface of the second PIC die opposite the bottom surface of the second PIC die; one or more curved mirrors; and one or more reflectors, wherein light from individual waveguides of the one or more waveguides of the first PIC die is to (i) reflect off of one of the one or more reflectors of the first PIC die to one of the one or more flat mirrors of the first PIC die, (ii) reflect off one of the one or more flat mirrors of the first PIC die to one of the one or more curved mirrors of the first PIC die, (iii) reflect off of one of the one or more curved mirrors of the first PIC die to one of the one or more curved mirrors of the second PIC die, (iv) reflect off of one of the one or more curved mirrors of the second PIC die to one of the one or more flat mirrors of the second PIC die, and (v) reflect off of one of the one or more reflectors of the second PIC die to one of the one or more waveguides of the second PIC die.

Example 16 includes the subject matter of Example 15, and further including an optical isolator between the first PIC die and the second PIC die, wherein light reflected off of the one or more curved mirrors of the first PIC die towards one of the one or more curved mirrors of the second PIC die is to pass through the optical isolator.

Example 17 includes the subject matter of any of Examples 15 and 16, and further including a compensator block, wherein a first set of waveguides of the one or more waveguides of the first PIC die are transmit waveguides to transmit light, wherein a second set of waveguides of the one or more waveguides of the first PIC die are receive waveguides to receive light, wherein a beam of light from a waveguide of the first set of waveguides is to pass through the optical isolator, wherein a beam of light to a waveguide of the second set of waveguides is to pass through the compensator block, wherein the compensator block causes a displacement to a beam about the same as a displacement to a beam caused by the optical isolator.

Example 18 includes the subject matter of any of Examples 15-17, and further including a compensator block, wherein a first set of waveguides of the one or more waveguides of the first PIC die are transmit waveguides to transmit light, wherein a second set of waveguides of the one or more waveguides of the first PIC die are receive waveguides to receive light, wherein individual waveguides of the first set of waveguides end at a first reflector, wherein individual waveguides of the second set of waveguides end at a second reflector, wherein the ends of the first set of waveguides are on a first line, wherein the ends of the second set of waveguides are on a second line, wherein the second line is offset relative to the first line.

Example 19 includes the subject matter of any of Examples 15-18, and further including a compensator block, wherein a first set of waveguides of the one or more waveguides of the first PIC die are transmit waveguides to transmit light, wherein a second set of waveguides of the one or more waveguides of the first PIC die are receive waveguides to receive light, wherein the first set of waveguides and the second set of waveguides are interleaved to form one or more pairs of waveguides, wherein individual pairs of the one or more pairs of waveguides comprise a transmit waveguide and a receive waveguide.

Example 20 includes the subject matter of any of Examples 15-19, and wherein the optical isolator has one or more holes in it for light to pass through to receive waveguides of the one or more pairs of waveguides.

Example 21 includes the subject matter of any of Examples 15-20, and wherein individual waveguides of the first set of waveguides end at a first reflector, wherein individual waveguides of the second set of waveguides end at a second reflector, wherein the ends of the first set of waveguides are on a first line, wherein the ends of the second set of waveguides are on a second line, wherein the second line is offset relative to the first line, wherein light from the first set of waveguides passes through the optical isolator, wherein light to the second set of waveguides does not pass through the optical isolator.

Example 22 includes the subject matter of any of Examples 15-21, and wherein the one or more curved mirrors of the first PIC die are to collimate light from the one or more waveguides of the first PIC die.

Example 23 includes the subject matter of any of Examples 15-22, and wherein the one or more curved mirrors are to collimate light from the one or more waveguides into beams with a beam width between 50 and 200 micrometers.

Example 24 includes the subject matter of any of Examples 15-23, and wherein the one or more curved mirrors extend past a plane defined by the top surface of the first PIC die.

Example 25 includes the subject matter of any of Examples 15-24, and wherein the one or more curved mirrors of the first PIC die extend past the plane defined by the top surface of the first PIC die by 0.5-10 micrometers.

Example 26 includes the subject matter of any of Examples 15-25, and wherein the first PIC die comprises silicon, wherein the one or more curved mirrors of the first PIC die comprise silicon, wherein the second PIC die comprises silicon, wherein the one or more curved mirrors of the second PIC die comprise silicon.

Example 27 includes the subject matter of any of Examples 15-26, and further including a circuit board, wherein the first PIC die is mated to the circuit board; and one or more electrical integrated circuits mated to the circuit board.

Example 28 includes an apparatus comprising a photonic integrated circuit (PIC) die comprising one or more waveguides; means for collimating light from the PIC die, wherein the means for collimating light from the PIC die is fixed in place relative to the PIC die; and an optical isolator, wherein collimated light from the PIC die passes through the optical isolator.

Example 29 includes the subject matter of Example 28, and further including means for transmitting light in a first set of waveguides of the one or more waveguides, wherein light from the first set of one or more waveguides passes through the optical isolator; and means for receiving light in a second set of waveguides of the one or more waveguides, wherein light to the second set of waveguides does not pass through the optical isolator.

The invention claimed is:

1. An apparatus comprising:
a photonic integrated circuit (PIC) die comprising:
one or more waveguides, wherein the one or more waveguides are disposed near a top surface of the PIC die;
one or more flat mirrors disposed on a bottom surface of the PIC die, the bottom surface opposite the top surface;
one or more curved mirrors; and
one or more reflectors, wherein individual reflectors of the one or more reflectors are to reflect light from the one or more waveguides towards one of the one or more flat mirrors; and
an optical isolator,
wherein individual flat mirrors of the one or more flat mirrors are to reflect light from one of the one or more reflectors towards one of the one or more curved mirrors,
wherein individual curved mirrors of the one or more curved mirrors reflect light from one of the flat mirrors of the one or more flat mirrors towards the optical isolator.

2. The apparatus of claim 1, further comprising a compensator block,
wherein a first set of waveguides of the one or more waveguides are transmit waveguides to transmit light,
wherein a second set of waveguides of the one or more waveguides are receive waveguides to receive light,
wherein a beam of light from a waveguide of the first set of waveguides is to pass through the optical isolator,
wherein a beam of light to a waveguide of the second set of waveguides is to pass through the compensator block, wherein the compensator block causes a displacement to a beam about the same as a displacement to a beam caused by the optical isolator.

3. The apparatus of claim 1, further comprising a compensator block,
wherein a first set of waveguides of the one or more waveguides are transmit waveguides to transmit light,
wherein a second set of waveguides of the one or more waveguides are receive waveguides to receive light,
wherein individual waveguides of the first set of waveguides end at a first reflector,
wherein individual waveguides of the second set of waveguides end at a second reflector,
wherein the ends of the first set of waveguides are on a first line,
wherein the ends of the second set of waveguides are on a second line,
wherein the second line is offset relative to the first line.

4. The apparatus of claim 1, further comprising a compensator block,
wherein a first set of waveguides of the one or more waveguides are transmit waveguides to transmit light,
wherein a second set of waveguides of the one or more waveguides are receive waveguides to receive light,
wherein the first set of waveguides and the second set of waveguides are interleaved to form one or more pairs of waveguides, wherein individual pairs of the one or more pairs of waveguides comprise a transmit waveguide and a receive waveguide.

5. The apparatus of claim 4, wherein the optical isolator has one or more holes in it for light to pass through to receive waveguides of the one or more pairs of waveguides.

6. The apparatus of claim 4, wherein individual waveguides of the first set of waveguides end at a first reflector,
wherein individual waveguides of the second set of waveguides end at a second reflector,
wherein the ends of the first set of waveguides are on a first line,
wherein the ends of the second set of waveguides are on a second line,
wherein the second line is offset relative to the first line,
wherein light from the first set of waveguides passes through the optical isolator,
wherein light to the second set of waveguides does not pass through the optical isolator.

7. The apparatus of claim 1, further comprising:
one or more optical fibers; and
one or more lenses, wherein individual lenses of the one or more lenses are to focus light from the PIC die that passes through the optical isolator into one of the one or more optical fibers.

8. The apparatus of claim 1, further comprising:
a second PIC die comprising:
one or more waveguides, wherein the one or more waveguides of the second PIC die are disposed near a bottom surface of the second PIC die;
one or more flat mirrors disposed on a top surface of the second PIC die, the top surface of the second PIC die opposite the bottom surface of the second PIC die;
one or more curved mirrors; and
one or more reflectors, wherein individual reflectors of the one or more reflectors of the second PIC die are to reflect light from the one or more curved mirrors of the second PIC die to one or more waveguides of the second PIC die,
wherein individual curved mirrors of the one or more curved mirrors of the second PIC die reflect light from the PIC die that passes through the optical isolator towards one of the one or more flat mirrors of the second PIC die,
wherein individual flat mirrors of the one or more flat mirrors of the second PIC die are to reflect light from one of the one or more curved mirrors of the second PIC die towards one of the one or more reflectors of the second PIC die.

9. The apparatus of claim 1, wherein the one or more curved mirrors are to collimate light from the one or more waveguides.

10. The apparatus of claim 9, wherein the one or more curved mirrors are to collimate light from the one or more waveguides into beams with a beam width between 50 and 200 micrometers.

11. The apparatus of claim 1, wherein the one or more curved mirrors extend past a plane defined by the top surface of the PIC die.

12. The apparatus of claim 11, wherein the one or more curved mirrors extend past the plane defined by the top surface of the PIC die by 0.5-10 micrometers.

13. The apparatus of claim 1, wherein the PIC die comprises silicon, wherein the one or more curved mirrors comprise silicon.

14. The apparatus of claim 1, further comprising:
a circuit board, wherein the PIC die is mated to the circuit board; and
one or more electrical integrated circuits mated to the circuit board.

15. A system comprising:
a first photonic integrated circuit (PIC) die comprising:
one or more waveguides, wherein the one or more waveguides of the first PIC die are disposed near a top surface of the first PIC die;
one or more flat mirrors disposed on a bottom surface of the first PIC die, the bottom surface of the first PIC die opposite the top surface of the first PIC die;
one or more curved mirrors; and
one or more reflectors; and
a second PIC die comprising:
one or more waveguides, wherein the one or more waveguides of the second PIC die are disposed near a bottom surface of the second PIC die;
one or more flat mirrors disposed on a top surface of the second PIC die, the top surface of the second PIC die opposite the bottom surface of the second PIC die;
one or more curved mirrors; and
one or more reflectors,
wherein light from individual waveguides of the one or more waveguides of the first PIC die is to (i) reflect off of one of the one or more reflectors of the first PIC die to one of the one or more flat mirrors of the first PIC die, (ii) reflect off one of the one or more flat mirrors of the first PIC die to one of the one or more curved mirrors of the first PIC die, (iii) reflect off of one of the one or more curved mirrors of the first PIC die to one of the one or more curved mirrors of the second PIC die, (iv) reflect off of one of the one or more curved mirrors of the second PIC die to one of the one or more flat mirrors of the second PIC die, and (v) reflect off of one of the one or more reflectors of the second PIC die to one of the one or more waveguides of the second PIC die.

16. The system of claim 15, further comprising an optical isolator between the first PIC die and the second PIC die, wherein light reflected off of the one or more curved mirrors of the first PIC die towards one of the one or more curved mirrors of the second PIC die is to pass through the optical isolator.

17. The system of claim 16, further comprising a compensator block,
wherein a first set of waveguides of the one or more waveguides of the first PIC die are transmit waveguides to transmit light, wherein a second set of waveguides of the one or more waveguides of the first PIC die are receive waveguides to receive light,
wherein a beam of light from a waveguide of the first set of waveguides is to pass through the optical isolator, wherein a beam of light to a waveguide of the second set of waveguides is to pass through the compensator block, wherein the compensator block causes a displacement to a beam about the same as a displacement to a beam caused by the optical isolator.

18. The system of claim 16, further comprising a compensator block,
wherein a first set of waveguides of the one or more waveguides of the first PIC die are transmit waveguides to transmit light, wherein a second set of waveguides of the one or more waveguides of the first PIC die are receive waveguides to receive light,
wherein individual waveguides of the first set of waveguides end at a first reflector,
wherein individual waveguides of the second set of waveguides end at a second reflector,
wherein the ends of the first set of waveguides are on a first line,
wherein the ends of the second set of waveguides are on a second line,
wherein the second line is offset relative to the first line.

19. The system of claim 15, further comprising a compensator block,
wherein a first set of waveguides of the one or more waveguides of the first PIC die are transmit waveguides to transmit light, wherein a second set of waveguides of the one or more waveguides of the first PIC die are receive waveguides to receive light,
wherein the first set of waveguides and the second set of waveguides are interleaved to form one or more pairs of waveguides, wherein individual pairs of the one or more pairs of waveguides comprise a transmit waveguide and a receive waveguide.

20. The system of claim 19, further comprising an optical isolator, wherein the optical isolator has one or more holes in it for light to pass through to receive waveguides of the one or more pairs of waveguides.

21. The system of claim 19, further comprising an optical isolator, wherein individual waveguides of the first set of waveguides end at a first reflector,
wherein individual waveguides of the second set of waveguides end at a second reflector,
wherein the ends of the first set of waveguides are on a first line,
wherein the ends of the second set of waveguides are on a second line,
wherein the second line is offset relative to the first line,
wherein light from the first set of waveguides passes through the optical isolator,
wherein light to the second set of waveguides does not pass through the optical isolator.

22. The system of claim 15, wherein the one or more curved mirrors of the first PIC die are to collimate light from the one or more waveguides of the first PIC die.

23. The system of claim 15, further comprising:
a circuit board, wherein the first PIC die is mated to the circuit board; and
one or more electrical integrated circuits mated to the circuit board.

24. An apparatus comprising:
a photonic integrated circuit (PIC) die comprising one or more waveguides;
means for collimating light from the PIC die, wherein the means for collimating light from the PIC die is fixed in place relative to the PIC die, wherein the means for collimating light from the PIC die comprises:
one or more flat mirrors disposed on a bottom surface of the PIC die, the bottom surface opposite a top surface;
one or more curved mirrors; and
one or more reflectors, wherein individual reflectors of the one or more reflectors are to reflect light from the one or more waveguides towards one of the one or more flat mirrors; and
an optical isolator, wherein collimated light from the PIC die passes through the optical isolator, wherein individual curved mirrors of the one or more curved mirrors reflect light from one of the flat mirrors of the one or more flat mirrors towards the optical isolator.

25. The apparatus of claim 24, further comprising:

means for transmitting light in a first set of waveguides of the one or more waveguides, wherein light from the first set of one or more waveguides passes through the optical isolator; and means for receiving light in a second set of waveguides of the one or more waveguides, wherein light to the second set of waveguides does not pass through the optical isolator.

* * * * *